US012699303B2

(12) United States Patent
Pongers et al.

(10) Patent No.: US 12,699,303 B2
(45) Date of Patent: Aug. 4, 2026

(54) HOLLOW-CORE OPTICAL FIBER BASED RADIATION SOURCE

(71) Applicant: ASML NETHERLANDS B.V., Veldhoven (NL)

(72) Inventors: Willem Richard Pongers, Veldhoven (NL); Patrick Sebastian Uebel, Marloffstein (DE); Johannes Richard Karl Kohler, Fürth (DE)

(73) Assignee: ASML NETHERLANDS B.V., Veldhoven (NL)

( * ) Notice: Subject to any disclaimer, the term of this patent is extended or adjusted under 35 U.S.C. 154(b) by 452 days.

(21) Appl. No.: 18/277,821

(22) PCT Filed: Feb. 17, 2022

(86) PCT No.: PCT/EP2022/053874
§ 371 (c)(1),
(2) Date: Aug. 18, 2023

(87) PCT Pub. No.: WO2022/194477
PCT Pub. Date: Sep. 22, 2022

(65) Prior Publication Data
US 2024/0152024 A1     May 9, 2024

(30) Foreign Application Priority Data

Mar. 16, 2021     (EP) ..................................... 21162819
May 6, 2021     (EP) ..................................... 21172376

(51) Int. Cl.
*G02F 1/365*     (2006.01)
*G02F 1/35*     (2006.01)

(52) U.S. Cl.
CPC ............ *G02F 1/365* (2013.01); *G02F 1/3513* (2013.01); *G02F 1/3528* (2021.01)

(58) Field of Classification Search
CPC ....... G02F 1/365; G02F 1/3513; G02F 1/3528
(Continued)

(56) References Cited

U.S. PATENT DOCUMENTS 6,952,253 B2     10/2005     Lof et al.
6,961,116 B2     11/2005     Den Boef et al.
(Continued)

FOREIGN PATENT DOCUMENTS

CN     104656186     5/2015
EP     1628164     2/2006
(Continued)

OTHER PUBLICATIONS

"Tunable vacuum-UV to visible ultrafast pulse source based on gas-filled Kagome-PCF" by Mak et al, Optics Express, vol. 21, No. 9, pp. 10942-10953 (Year: 2013).*
(Continued)

*Primary Examiner* — Robert Tavlykaev
(74) *Attorney, Agent, or Firm* — Pillsbury Winthrop Shaw Pittman, LLP

(57) ABSTRACT

A radiation source including: a hollow core optical fiber having a body having a hollow core for confining a working medium, the hollow core optical fiber being operable to receive pulsed pump radiation such that the received pulsed pump radiation propagates through the hollow core from an input end to an output end of the hollow core optical fiber, wherein one or more source parameters of the radiation source are configured such that the pulsed pump radiation undergoes a soliton self-compression process so as to change a spectrum of the pulsed pump radiation to form output radiation; and at least one dispersion control mechanism being operable to change dispersion characteristics in
(Continued)

a first portion of the optical fiber so as to spectrally shift a dispersive wave generated in the soliton self-compression process.

20 Claims, 10 Drawing Sheets

(58) Field of Classification Search
USPC ......................................................... 385/122
See application file for complete search history.

(56) References Cited

U.S. PATENT DOCUMENTS

| | | | |
|---|---|---|---|
| 7,265,364 | B2 | 9/2007 | Teunissen et al. |
| 7,646,471 | B2 | 1/2010 | Teunissen et al. |
| 8,681,312 | B2 | 3/2014 | Straaijer |
| 8,692,994 | B2 | 4/2014 | Straaijer |
| 8,792,096 | B2 | 7/2014 | Straaijer |
| 8,797,554 | B2 | 8/2014 | Straaijer |
| 8,823,922 | B2 | 9/2014 | Den Boef |
| 9,160,137 | B1 * | 10/2015 | Abdolvand .......... H01S 3/0092 |
| 9,977,180 | B2 | 5/2018 | Hoppe et al. |
| 2004/0015085 | A1 | 1/2004 | Soh et al. |
| 2007/0296960 | A1 | 12/2007 | Den Boef et al. |
| 2008/0198380 | A1 | 8/2008 | Straaijer et al. |
| 2009/0168062 | A1 | 7/2009 | Straaijer |
| 2010/0007863 | A1 | 1/2010 | Jordanoska |
| 2010/0233600 | A1 | 9/2010 | Den Boef et al. |
| 2010/0328655 | A1 | 12/2010 | Den Boef |
| 2011/0026032 | A1 | 2/2011 | Den Boef et al. |
| 2011/0102753 | A1 | 5/2011 | Van De Kerkhof et al. |
| 2011/0249244 | A1 | 10/2011 | Leewis et al. |
| 2012/0044470 | A1 | 2/2012 | Smilde et al. |
| 2013/0162996 | A1 | 6/2013 | Straaijer et al. |
| 2015/0261097 | A1 | 9/2015 | Mathijssen et al. |
| 2016/0161863 | A1 | 6/2016 | Den Boef et al. |
| 2016/0370717 | A1 | 12/2016 | Den Boef et al. |

FOREIGN PATENT DOCUMENTS

| | | |
|---|---|---|
| EP | 3767375 | 1/2021 |
| JP | 2017511897 | 4/2017 |
| TW | 201901206 | 1/2019 |
| WO | 2011/012624 | 2/2011 |
| WO | 2016/102127 | 6/2016 |
| WO | 2017/032454 | 3/2017 |
| WO | 2018/127266 | 7/2018 |

OTHER PUBLICATIONS

"Femtosecond pulse propagation in temperature controlled gas-filled hollow fiber" by Song et al, Optics Communications vol. 281, pp. 4109-4113 (Year: 2008).*

"Supercontinuum generation in the vacuum ultraviolet through dispersive-wave and soliton-plasma interaction in noble-gas-filled hollow-core photonic crystal fiber" by Ermolov et al, arXiv preprint arXiv:1503.09033 (Year: 2015).*

"Extreme supercontinuum generation to the deep UV" by Stark et al, Optics Letters vol. 37, No. 5, pp. 770-772 (Year: 2012).*

International Search Report and Written Opinion issued in corresponding PCT Patent Application No. PCT/EP2022/053874, dated Apr. 19, 2022.

Office Action issued in corresponding Taiwanese Application No. 111108470, dated Feb. 3, 2023.

R. Pennetta et al., "Fabrication and non-destructive characterization of tapered single-ring hollow-core photonic crystal fiber", APL Photon, 4, pp. 1-6 (2019).

J. C. Travers et al, "High-energy pulse self-compression and ultra-violet generation through soliton dynamics in hollow capillary fibres", arXiv:1811.05877 (accessed on Aug. 16, 2023) (2018).

M. G. Welch et al., "Solitons in Hollow Core Photonic Crystal Fiber: Engineering Nonlinearity and Compressing Pulses", Journal of Lightwave Technology, vol. 27, No. 11, pp. 1644-1645 (2009).

J. C. Travers et al., "Ultrafast nonlinear optics in gas-filled hollow-core photonic crystal fibers", Optical Society of America, vol. 28, No. 12, pp. 11-26 (2011).

S. Berg-Johansen et al., "Classically entangled optical beams for high-speed kinematic sensing," Optica 2, 864-868 (2015).

Office Action issued in corresponding Japanese Patent Application No. 2023-551113, dated Oct. 29, 2025.

Md. S. Habib et al., "Extreme UV Light Generation Through Dispersive Wave Trapping in a Tapered Gas-Filled Hollow Fiber", IEEE Photonics Technology Letters, vol. 31, No. 10, pp. 795-798 (2019).

W. Chang et al., "UV Continuum Generation in Ar-Filled Hollow-Core PCF", IEEE Xplore, pp. 1-2 (2012).

* cited by examiner

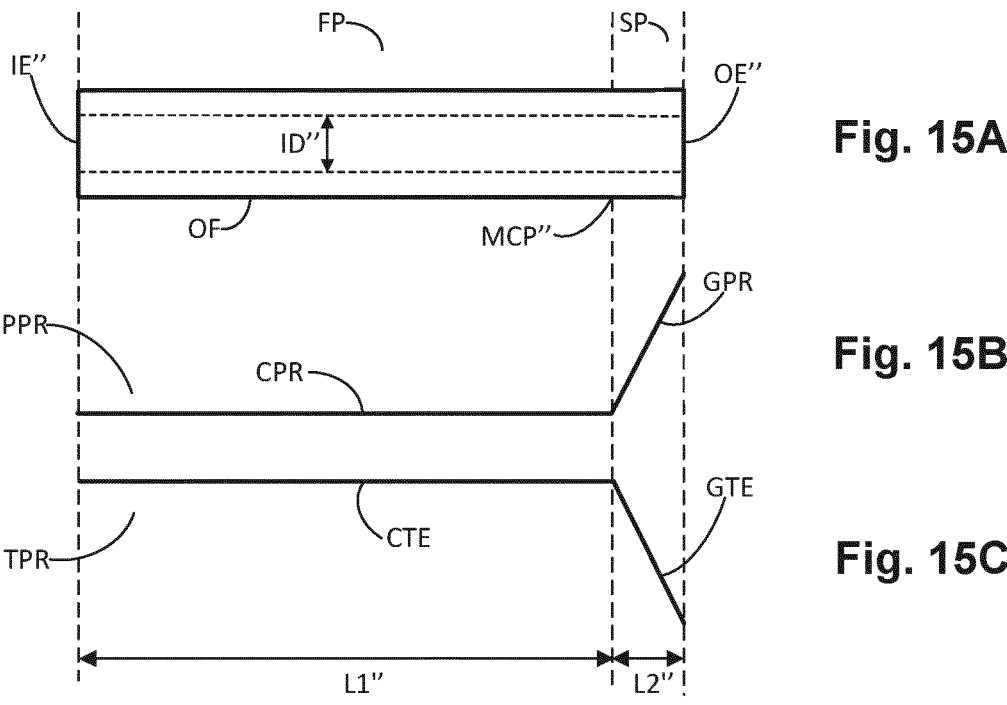
Fig. 15A
Fig. 15B
Fig. 15C
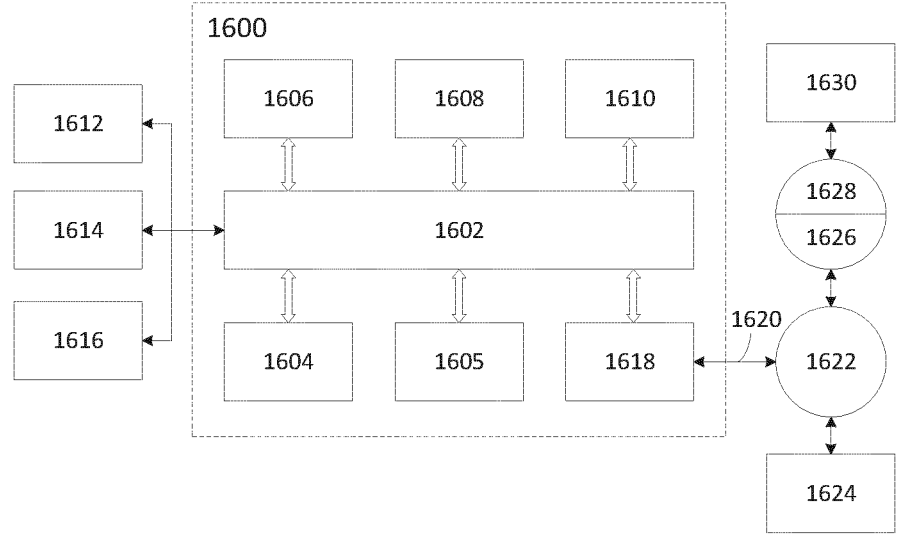
Fig. 16

HOLLOW-CORE OPTICAL FIBER BASED RADIATION SOURCE

CROSS-REFERENCE TO RELATED APPLICATIONS

This application is the U.S. national phase entry of PCT Patent Application No. PCT/EP2022/053874 which was filed on Feb. 17, 2022, which claims priority of European Patent Application No. 21162819.3 which was filed on Mar. 16, 2021 and of European Patent Application No. 21172376.2 which was filed on May 6, 2021 which are incorporated herein in their entireties by reference.

FIELD

The present invention relates to a hollow-core optical fiber based broadband radiation source, and in particular such a broadband radiation source in relation to metrology applications in the manufacture of integrated circuits.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1\times\lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

Metrology tools are used in many aspects of the IC manufacturing process, for example as alignment tools for proper positioning of a substrate prior to an exposure, leveling tools to measure a surface topology of the substrate, for e.g., focus control and scatterometry based tools for inspecting/measuring the exposed and/or etched product in process control. In each case, a radiation source is required. For various reasons, including measurement robustness and accuracy, broadband or white light radiation sources are increasingly used for such metrology applications. It would be desirable to improve on present devices for broadband radiation generation.

SUMMARY

In a first aspect of the invention there is provided a radiation source comprising: a hollow core optical fiber comprising a body having a hollow core for confining a working medium, said hollow core optical fiber being operable to receive pulsed pump radiation such that said receive pulsed pump radiation propagates through the hollow core from an input end to an output end of the hollow core optical fiber; wherein source parameters of the radiation source are configured such that the pulsed pump radiation undergoes a soliton self-compression process so as to change a spectrum of the pulsed pump radiation to form output radiation, said source parameters also being such that the spectrum of the pulsed pump radiation has reached its maximum breadth before exiting the optical fiber via the output end; the broadband light source device further comprising at least one dispersion control mechanism being operable to change dispersion characteristics in a first portion of the optical fiber so as to spectrally shift a dispersive wave generated in the soliton self-compression process.

In a second aspect of the invention there is provided a method of generating output radiation comprising: selecting parameters of one or more of pulsed pump radiation, a hollow core optical fiber comprising a body having a hollow core and a working medium comprised within said hollow core such that the pulsed pump radiation undergoes a soliton self-compression process so as to change a spectrum of the pulsed pump radiation so as to form output radiation, the spectrum of the pulsed pump radiation having reached its maximum breadth before exiting the optical fiber via the output end, generating said pulsed pump radiation for reception by, and propagation through, the hollow core from an input end to an output end; and applying at least one dispersion control mechanism in a first portion of the optical fiber so as to change dispersion characteristics in the first portion of the optical fiber to spectrally shift a dispersive wave generated in the soliton self-compression process.

Other aspects of the invention comprise metrology device comprising the broadband light source device of the first aspect.

BRIEF DESCRIPTION OF THE DRAWINGS

Embodiments of the invention will now be described, by way of example only, with reference to the accompanying schematic drawings, in which:

FIG. 15A depicts schematically an optical fiber OF used for generating broadband output radiation;

FIG. 15B depicts schematically an example pressure profile applied for improving the spectral flatness of the broadband output radiation generated in the optical fiber shown in FIG. 15A;

FIG. 15C depicts schematically an example temperature profile applied for improving the spectral flatness of the broadband output radiation generated in the optical fiber shown in FIG. 15A; and FIG. 16 depicts a block diagram of a computer system for controlling a broadband radiation source.

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figure 1:
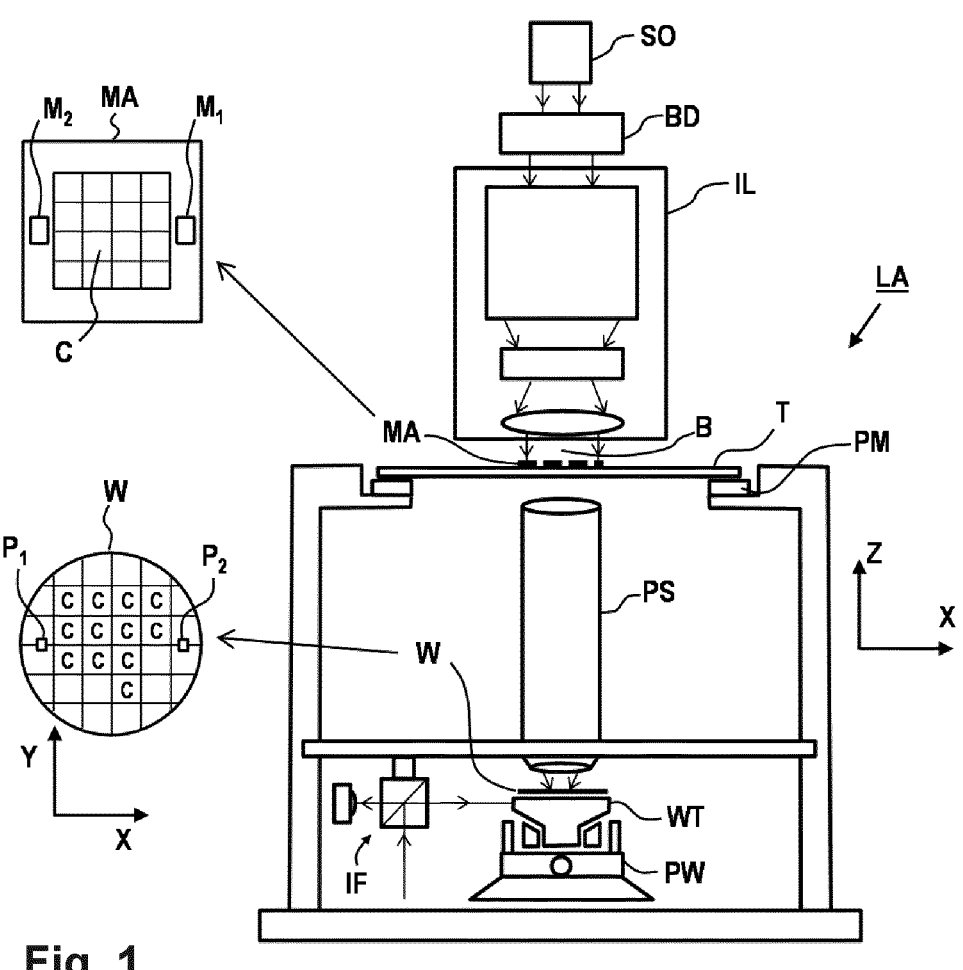
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) MT constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in US6952253, which is incorporated herein by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support MT, and is patterned by the pattern (design layout) present on patterning device MA. Having traversed the mask MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 2:
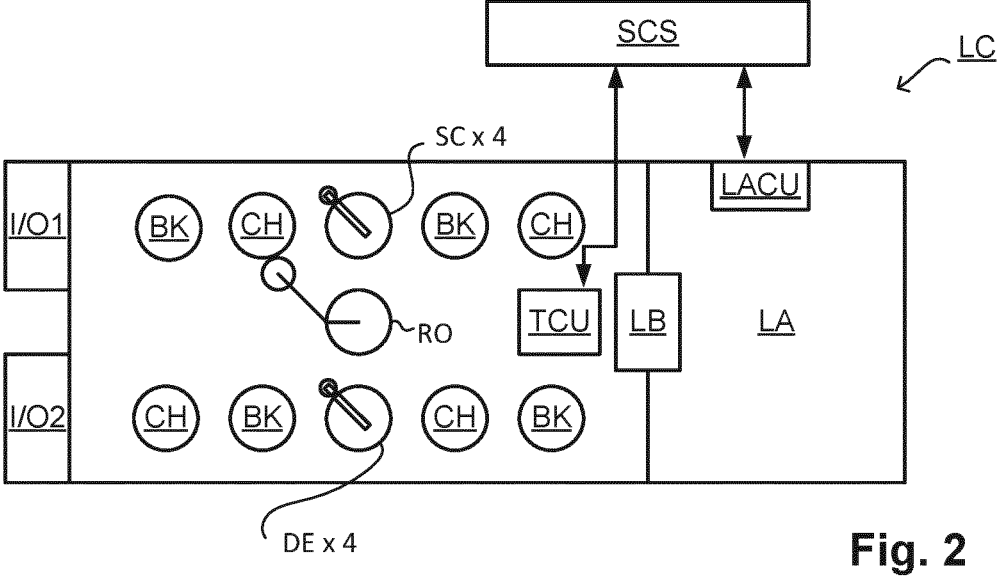
FIG. 2 depicts a schematic overview of a lithographic cell.

As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports 1/01, 1/02, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
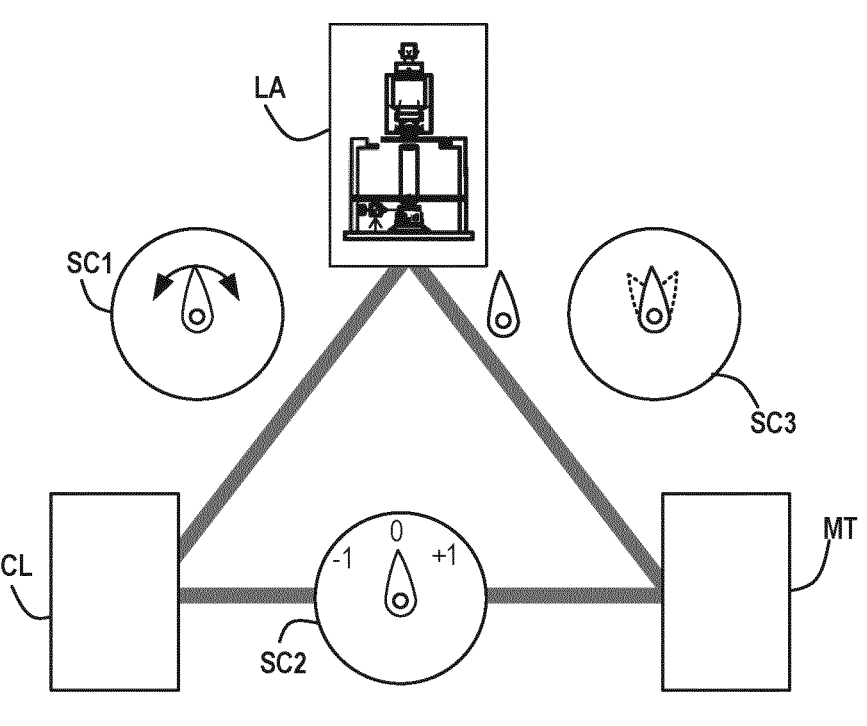
FIG. 3 depicts a schematic representation of holistic lithography, representing a cooperation between three key technologies to optimize semiconductor manufacturing.

Typically the patterning process in a lithographic apparatus LA is one of the most critical steps in the processing which requires high accuracy of dimensioning and placement of structures on the substrate W. To ensure this high accuracy, three systems may be combined in a so called "holistic" control environment as schematically depicted in FIG. 3. One of these systems is the lithographic apparatus LA which is (virtually) connected to a metrology tool MT (a second system) and to a computer system CL (a third system). The key of such "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

In lithographic processes, it is desirable to make frequently measurements of the structures created, e.g., for process control and verification. Tools to make such measurement are typically called metrology tools MT. Different types of metrology tools MT for making such measurements are known, including scanning electron microscopes or various forms of scatterometer metrology tools MT. Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in patent applications US20100328655, US2011102753A1, US20120044470A, US20110249244, US20110026032 or EP1,628,164A, incorporated herein by reference in their entirety. Aforementioned scatterometers may measure gratings using light from soft x-ray and visible to near-IR wavelength range.

In a first embodiment, the scatterometer MT is an angular resolved scatterometer. In such a scatterometer reconstruction methods may be applied to the measured signal to reconstruct or calculate properties of the grating. Such reconstruction may, for example, result from simulating interaction of scattered radiation with a mathematical model of the target structure and comparing the simulation results with those of a measurement. Parameters of the mathematical model are adjusted until the simulated interaction produces a diffraction pattern similar to that observed from the real target.

In a second embodiment, the scatterometer MT is a spectroscopic scatterometer MT. In such spectroscopic scatterometer MT, the radiation emitted by a radiation source is directed onto the target and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In a third embodiment, the scatterometer MT is an ellipsometric scatterometer. The ellipsometric scatterometer allows for determining parameters of a lithographic process by measuring scattered radiation for each polarization states. Such metrology apparatus emits polarized light (such as linear, circular, or elliptic) by using, for example, appropriate polarization filters in the illumination section of the metrology apparatus. A source suitable for the metrology apparatus may provide polarized radiation as well. Various embodiments of existing ellipsometric scatterometers are described in U.S. patent application Ser. Nos. 11/451,599, 11/708,678, 12/256,780, 12/486,449, 12/920,968, 12/922, 587, 13/000,229, 13/033,135, 13/533,110 and 13/891,410 incorporated herein by reference in their entirety.

In one embodiment of the scatterometer MT, the scatterometer MT is adapted to measure the overlay of two misaligned gratings or periodic structures by measuring asymmetry in the reflected spectrum and/or the detection configuration, the asymmetry being related to the extent of the overlay. The two (typically overlapping) grating structures may be applied in two different layers (not necessarily consecutive layers), and may be formed substantially at the same position on the wafer. The scatterometer may have a symmetrical detection configuration as described e.g. in co-owned patent application EP1,628,164A, such that any asymmetry is clearly distinguishable. This provides a straightforward way to measure misalignment in gratings. Further examples for measuring overlay error between the two layers containing periodic structures as target is measured through asymmetry of the periodic structures may be found in PCT patent application publication no. WO 2011/012624 or US patent application US 20160161863, incorporated herein by reference in its entirety.

Other parameters of interest may be focus and dose. Focus and dose may be determined simultaneously by scatterometry (or alternatively by scanning electron microscopy) as described in US patent application US2011-0249244, incorporated herein by reference in its entirety. A single structure may be used which has a unique combination of critical dimension and sidewall angle measurements for each point in a focus energy matrix (FEM—also referred to as Focus Exposure Matrix). If these unique combinations of critical dimension and sidewall angle are available, the focus and dose values may be uniquely determined from these measurements.

A metrology target may be an ensemble of composite gratings, formed by a lithographic process, mostly in resist, but also after etch process for example. Typically the pitch and line-width of the structures in the gratings strongly depend on the measurement optics (in particular the NA of the optics) to be able to capture diffraction orders coming from the metrology targets. As indicated earlier, the diffracted signal may be used to determine shifts between two layers (also referred to 'overlay') or may be used to reconstruct at least part of the original grating as produced by the lithographic process. This reconstruction may be used to provide guidance of the quality of the lithographic process and may be used to control at least part of the lithographic process. Targets may have smaller sub-segmentation which are configured to mimic dimensions of the functional part of the design layout in a target. Due to this sub-segmentation, the targets will behave more similar to the functional part of the design layout such that the overall process parameter measurements resembles the functional part of the design layout better. The targets may be measured in an underfilled mode or in an overfilled mode. In the underfilled mode, the measurement beam generates a spot that is smaller than the overall target. In the overfilled mode, the measurement beam generates a spot that is larger than the overall target. In such overfilled mode, it may also be possible to measure different targets simultaneously, thus determining different processing parameters at the same time.

Overall measurement quality of a lithographic parameter using a specific target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in US patent application US2016-0161863 and published US patent application US 2016/0370717A1 incorporated herein by reference in its entirety.

Figure 4:
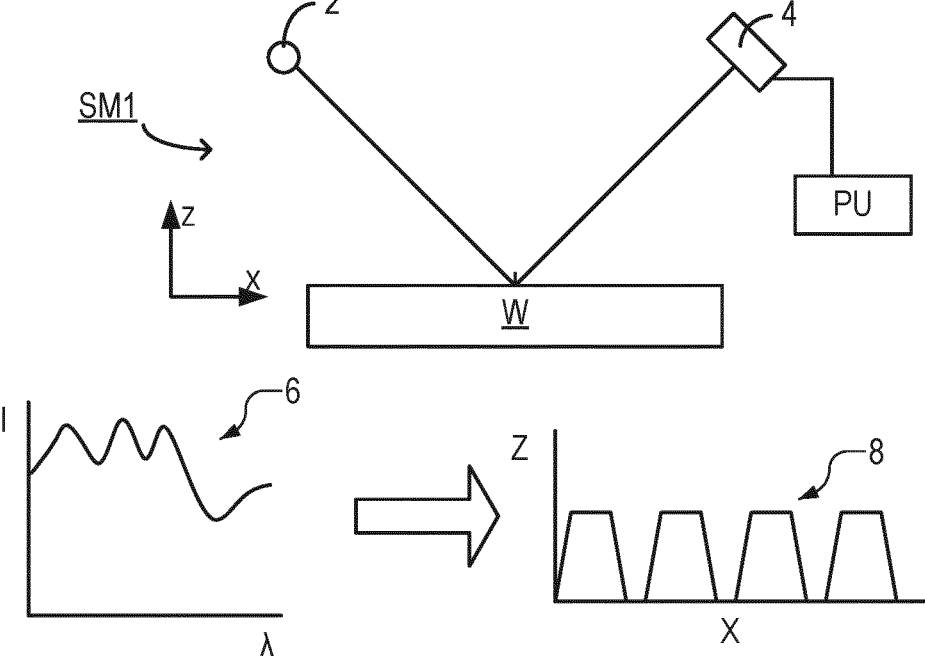
FIG. 4 depicts a schematic overview of a scatterometry apparatus used as a metrology device, which may comprise a radiation source according to embodiments of the invention.

A metrology apparatus, such as a scatterometer, is depicted in FIG. 4. It comprises a broadband (white light) radiation projector 2 which projects radiation onto a substrate 6. The reflected or scattered radiation is passed to a spectrometer detector 4, which measures a spectrum 10 (i.e. a measurement of intensity as a function of wavelength) of the specular reflected radiation. From this data, the structure or profile giving rise to the detected spectrum may be reconstructed by processing unit PU, e.g. by Rigorous Coupled Wave Analysis and non-linear regression or by comparison with a library of simulated spectra as shown at the bottom of FIG. 3. In general, for the reconstruction, the general form of the structure is known and some parameters are assumed from knowledge of the process by which the structure was made, leaving only a few parameters of the structure to be determined from the scatterometry data. Such a scatterometer may be configured as a normal-incidence scatterometer or an oblique-incidence scatterometer.

Overall measurement quality of a lithographic parameter via measurement of a metrology target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in US patent application US2016/0161863 and published US patent application US 2016/0370717A1 incorporated herein by reference in its entirety.

Another type of metrology tool used in IC manufacture is a topography measurement system, level sensor or height sensor. Such a tool may be integrated in the lithographic apparatus, for measuring a topography of a top surface of a substrate (or wafer). A map of the topography of the substrate, also referred to as height map, may be generated from these measurements indicating a height of the substrate as a function of the position on the substrate. This height map may subsequently be used to correct the position of the substrate during transfer of the pattern on the substrate, in order to provide an aerial image of the patterning device in a properly focus position on the substrate. It will be understood that "height" in this context refers to a dimension broadly out of the plane to the substrate (also referred to as Z-axis). Typically, the level or height sensor performs measurements at a fixed location (relative to its own optical system) and a relative movement between the substrate and the optical system of the level or height sensor results in height measurements at locations across the substrate.

Figure 5:
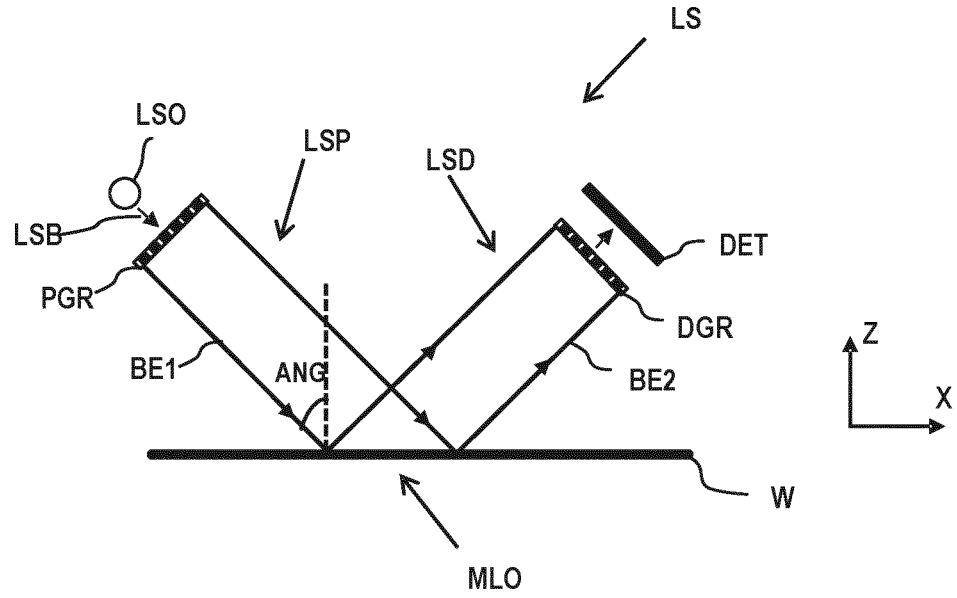
FIG. 5 depicts a schematic overview of a level sensor apparatus which may comprise a radiation source according to embodiments of the invention.

An example of a level or height sensor LS as known in the art is schematically shown in FIG. 5, which illustrates only the principles of operation. In this example, the level sensor comprises an optical system, which includes a projection unit LSP and a detection unit LSD. The projection unit LSP comprises a radiation source LSO providing a beam of radiation LSB which is imparted by a projection grating PGR of the projection unit LSP. The radiation source LSO may be, for example, a narrowband or broadband light source, such as a supercontinuum light source, polarized or non-polarized, pulsed or continuous, such as a polarized or non-polarized laser beam. The radiation source LSO may include a plurality of radiation sources having different colors, or wavelength ranges, such as a plurality of LEDs. The radiation source LSO of the level sensor LS is not restricted to visible radiation, but may additionally or alternatively encompass UV and/or IR radiation and any range of wavelengths suitable to reflect from a surface of a substrate.

The projection grating PGR is a periodic grating comprising a periodic structure resulting in a beam of radiation BE1 having a periodically varying intensity. The beam of radiation BE1 with the periodically varying intensity is directed towards a measurement location MLO on a substrate W having an angle of incidence ANG with respect to an axis perpendicular (Z-axis) to the incident substrate surface between 0 degrees and 90 degrees, typically between 70 degrees and 80 degrees. At the measurement location MLO, the patterned beam of radiation BE1 is reflected by the substrate W (indicated by arrows BE2) and directed towards the detection unit LSD.

In order to determine the height level at the measurement location MLO, the level sensor further comprises a detection system comprising a detection grating DGR, a detector DET and a processing unit (not shown) for processing an output signal of the detector DET. The detection grating DGR may be identical to the projection grating PGR. The detector DET produces a detector output signal indicative of the light received, for example indicative of the intensity of the light received, such as a photodetector, or representative of a spatial distribution of the intensity received, such as a camera. The detector DET may comprise any combination of one or more detector types.

By means of triangulation techniques, the height level at the measurement location MLO can be determined. The detected height level is typically related to the signal strength as measured by the detector DET, the signal strength having a periodicity that depends, amongst others, on the design of the projection grating PGR and the (oblique) angle of incidence ANG.

The projection unit LSP and/or the detection unit LSD may include further optical elements, such as lenses and/or mirrors, along the path of the patterned beam of radiation between the projection grating PGR and the detection grating DGR (not shown).

In an embodiment, the detection grating DGR may be omitted, and the detector DET may be placed at the position where the detection grating DGR is located. Such a configuration provides a more direct detection of the image of the projection grating PGR.

In order to cover the surface of the substrate W effectively, a level sensor LS may be configured to project an array of measurement beams BE1 onto the surface of the substrate W, thereby generating an array of measurement areas MLO or spots covering a larger measurement range.

Various height sensors of a general type are disclosed for example in U.S. Pat. Nos. 7,265,364 and 7,646,471, both incorporated by reference. A height sensor using UV radiation instead of visible or infrared radiation is disclosed in US2010233600A1, incorporated by reference. In WO2016102127A1, incorporated by reference, a compact height sensor is described which uses a multi-element detector to detect and recognize the position of a grating image, without needing a detection grating.

Another type of metrology tool used in IC manufacture is an alignment sensor. A critical aspect of performance of the lithographic apparatus is therefore the ability to place the applied pattern correctly and accurately in relation to features laid down in previous layers (by the same apparatus or a different lithographic apparatus). For this purpose, the substrate is provided with one or more sets of marks or targets. Each mark is a structure whose position can be measured at a later time using a position sensor, typically an optical position sensor. The position sensor may be referred to as "alignment sensor" and marks may be referred to as "alignment marks".

A lithographic apparatus may include one or more (e.g. a plurality of) alignment sensors by which positions of alignment marks provided on a substrate can be measured accurately. Alignment (or position) sensors may use optical phenomena such as diffraction and interference to obtain position information from alignment marks formed on the substrate. An example of an alignment sensor used in current lithographic apparatus is based on a self-referencing interferometer as described in U.S. Pat. No. 6,961,116. Various enhancements and modifications of the position sensor have been developed, for example as disclosed in US2015261097A1. The contents of all of these publications are incorporated herein by reference.

Figure 6:
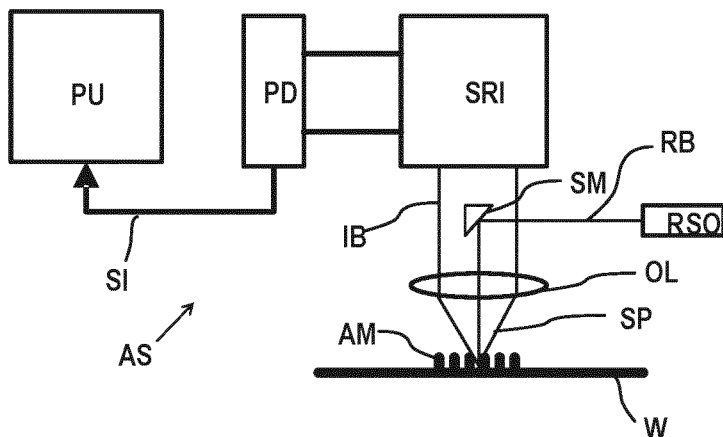
FIG. 6 depicts a schematic overview of an alignment sensor apparatus which may comprise a radiation source according to embodiments of the invention.

FIG. 6 is a schematic block diagram of an embodiment of a known alignment sensor AS, such as is described, for example, in U.S. Pat. No. 6,961,116, and which is incorporated by reference. Radiation source RSO provides a beam RB of radiation of one or more wavelengths, which is diverted by diverting optics onto a mark, such as mark AM located on substrate W, as an illumination spot SP. In this example the diverting optics comprises a spot mirror SM and an objective lens OL. The illumination spot SP, by which the mark AM is illuminated, may be slightly smaller in diameter than the width of the mark itself.

Radiation diffracted by the alignment mark AM is collimated (in this example via the objective lens OL) into an information-carrying beam IB. The term "diffracted" is intended to include zero-order diffraction from the mark (which may be referred to as reflection). A self-referencing interferometer SRI, e.g. of the type disclosed in U.S. Pat. No. 6,961,116 mentioned above, interferes the beam IB with itself after which the beam is received by a photodetector PD. Additional optics (not shown) may be included to provide separate beams in case more than one wavelength is created by the radiation source RSO. The photodetector may be a single element, or it may comprise a number of pixels, if desired. The photodetector may comprise a sensor array.

The diverting optics, which in this example comprises the spot mirror SM, may also serve to block zero order radiation reflected from the mark, so that the information-carrying beam IB comprises only higher order diffracted radiation from the mark AM (this is not essential to the measurement, but improves signal to noise ratios).

Intensity signals SI are supplied to a processing unit PU. By a combination of optical processing in the block SRI and computational processing in the unit PU, values for X- and Y-position on the substrate relative to a reference frame are output.

A single measurement of the type illustrated only fixes the position of the mark within a certain range corresponding to one pitch of the mark. Coarser measurement techniques are used in conjunction with this to identify which period of a sine wave is the one containing the marked position. The same process at coarser and/or finer levels may be repeated at different wavelengths for increased accuracy and/or for robust detection of the mark irrespective of the materials from which the mark is made, and materials on and/or below which the mark is provided. The wavelengths may be multiplexed and de-multiplexed optically so as to be processed simultaneously, and/or they may be multiplexed by time division or frequency division.

In this example, the alignment sensor and spot SP remain stationary, while it is the substrate W that moves. The alignment sensor can thus be mounted rigidly and accurately to a reference frame, while effectively scanning the mark AM in a direction opposite to the direction of movement of substrate W. The substrate W is controlled in this movement by its mounting on a substrate support and a substrate positioning system controlling the movement of the substrate support. A substrate support position sensor (e.g. an interferometer) measures the position of the substrate support (not shown). In an embodiment, one or more (alignment) marks are provided on the substrate support. A measurement of the position of the marks provided on the substrate support allows the position of the substrate support as determined by the position sensor to be calibrated (e.g. relative to a frame to which the alignment system is connected). A measurement of the position of the alignment marks provided on the substrate allows the position of the substrate relative to the substrate support to be determined.

Metrology tools MT, such as a scatterometer, topography measurement system, or position measurement system mentioned above may use radiation originating from a radiation source to perform a measurement. The properties of the radiation used by a metrology tool may affect the type and quality of measurements that may be performed. For some applications, it may be advantageous to use multiple radiation frequencies to measure a substrate, for example broadband radiation may be used. Multiple different frequencies may be able to propagate, irradiate, and scatter off a metrology target with no or minimal interference with other frequencies. Therefore different frequencies may for example be used to obtain more metrology data simultaneously. Different radiation frequencies may also be able to interrogate and discover different properties of a metrology target. Broadband radiation may be useful in metrology systems MT such as for example level sensors, alignment mark measurement systems, scatterometry tools, or inspection tools. A broadband radiation source may be a supercontinuum source.

High quality broadband radiation, for example supercontinuum radiation, may be difficult to generate. One method for generating broadband radiation may be to broaden high-power narrow band or single frequency input radiation or pump radiation, for example making use of non-linear, higher order effects. The input radiation (which may be produced using a laser) may be referred to as pump radiation. Alternatively, the input radiation may be referred to as seed radiation. To obtain high power radiation for broadening effects, radiation may be confined into a small area so that strongly localised high intensity radiation is achieved. In those areas, the radiation may interact with broadening structures and/or materials forming a non-linear medium so as to create broadband output radiation. In the high intensity radiation areas, different materials and/or structures may be used to enable and/or improve radiation broadening by providing a suitable non-linear medium.

In some implementations, the broadband output radiation is created in a photonic crystal fiber (PCF). In several embodiments, such a photonic crystal fiber has microstructures around its fiber core assisting in confining radiation that travels through the fiber in the fiber core. The fiber core can be made of a solid material that has non-linear properties and that is capable of generating broadband radiation when high intensity pump radiation is transmitted through the fiber core. Although it is feasible to generate broadband radiation in solid core photonic crystal fibers, there may be a few disadvantages of using a solid material. For example, if UV radiation is generated in the solid core, this radiation might not be present in the output spectrum of the fiber because the radiation is absorbed by most solid material.

In some implementations, as discussed further below with reference to FIG. 8, methods and apparatus for broadening input radiation may use a fiber for confining input radiation, and for broadening the input radiation to output broadband radiation. The fiber may be a hollow core fiber, and may comprise internal structures to achieve effective guiding and confinement of radiation in the fiber. The fiber may be a hollow core photonic crystal fiber (HC-PCF), which is particularly suitable for strong radiation confinement, predominantly inside the hollow core of the fiber, achieving high radiation intensities. The hollow core of the fiber may be filled with a gas acting as a broadening medium for broadening input radiation. Such a fiber and gas arrangement may be used to create a supercontinuum radiation source. Radiation input to the fiber may be electromagnetic radiation, for example radiation in one or more of the infrared, visible, UV, and extreme UV spectra. The output radiation may consist of or comprise broadband radiation, which may be referred to herein as white light.

Some embodiments relate to a new design of such a broadband radiation source comprising an optical fiber. The optical fiber is a hollow-core, photonic crystal fiber (HC-PCF). In particular, the optical fiber may be a hollow-core, photonic crystal fiber of a type comprising anti-resonant structures for confinement of radiation. Such fibers comprising anti-resonant structures are known in the art as anti-resonant fibers, tubular fibers, single-ring fibers, negative curvature fibers or inhibited coupling fibers. Various different designs of such fibers are known in the art. Alternatively, the optical fiber may be photonic bandgap fibers (HC-PBFs, for example a Kagome fiber).

A number of types of HC-PCFs can be engineered, each based on a different physical guidance mechanism. Two such HC-PCFs include: hollow-core photonic bandgap fibers (HC-PBFs) and hollow-core anti-resonant reflecting fibers (HC-ARFs). Detail on the design and manufacture of HC-PCFs can be found in US patent US2004/015085A1 (for HC-PBFs) and International PCT patent application WO2017/032454A1 (for Hollow Core anti-resonant reflecting fibers), which are incorporated herein by reference. FIG. 9(a) shows a Kagome fiber, comprising a Kagome lattice structure.

Figure 7:
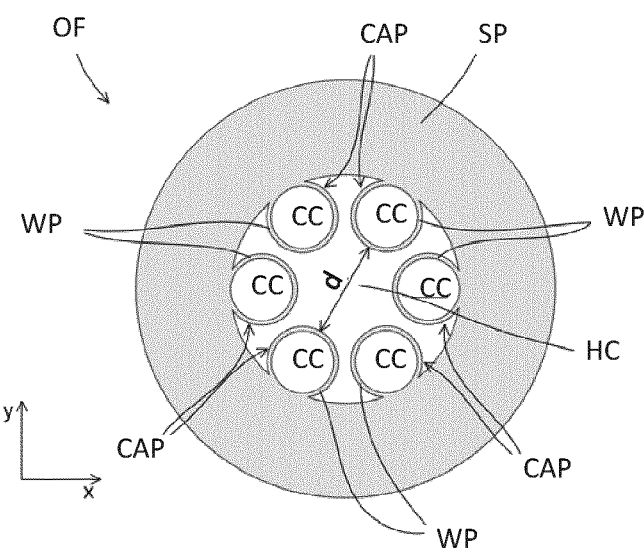
FIG. 7 is a schematic cross sectional view of a hollow core optical fiber that may form part of a radiation source according to an embodiment in a transverse plane (i.e. perpendicular to an axis of the optical fiber)

An example of an optical fiber for use in the radiation source is now described with reference to FIG. 7, which is a schematic cross sectional view of the optical fiber OF in a transverse plane. Further embodiments similar to the practical example of the fiber of FIG. 7 are disclosed in WO2017/032454-1.

The optical fiber OF comprises an elongate body, which is longer in one dimension compared to the other two dimensions of the fiber OF. This longer dimension may be referred to as an axial direction and may define an axis of the optical fiber OF. The two other dimensions define a plane which may be referred to as a transverse plane. FIG. 7 shows a cross-section of the optical fiber OF in this transverse plane (i.e. perpendicular to the axis), which is labelled as the x-y plane. The transverse cross-section of the optical fiber OF may be substantially constant along the fiber axis.

It will be appreciated that the optical fiber OF has some degree of flexibility and therefore the direction of the axis will not, in general, be uniform along the length of the optical fiber OF. The terms such as the optical axis, the transverse cross-section and the like will be understood to mean the local optical axis, the local transverse cross-section and so on. Furthermore, where components are described as being cylindrical or tubular these terms will be understood to encompass such shapes that may have been distorted as the optical fiber OF is flexed.

The optical fiber OF may have any length and it will be appreciated that the length of the optical fiber OF may be dependent on the application. The optical fiber OF may have a length between 1 cm and 10 m, for example, the optical fiber OF may have a length between 10 cm and 100 30 cm.

The optical fiber OF comprises: a hollow core HC; a cladding portion surrounding the hollow core HC; and a support portion SP surrounding and supporting the cladding portion. The optical fiber OF may be considered to comprise a body (comprising the cladding portion and the support portion SP) having a hollow core HC. The cladding portion comprises a plurality of anti-resonance elements for guiding radiation through the hollow core HC. In particular, the plurality of anti-resonance elements are arranged to confine radiation that propagates through the optical fiber OF predominantly inside the hollow core HC and to guide the radiation along the optical fiber OF. The hollow core HC of the optical fiber OF may be disposed substantially in a central region of the optical fiber OF, so that the axis of the optical fiber OF may also define an axis of the hollow core HC of the optical fiber OF.

The cladding portion comprises a plurality of anti-resonance elements for guiding radiation propagating through the optical fiber OF. In particular, in this embodiment, the cladding portion comprises a single ring of six tubular capillaries CAP. Each of the tubular capillaries CAP acts as an anti-resonance element.

The capillaries CAP may also be referred to as tubes. The capillaries CAP may be circular in cross section, or may have another shape. Each capillary CAP comprises a generally cylindrical wall portion WP that at least partially defines the hollow core HC of the optical fiber OF and separates the hollow core HC from a capillary cavity CC. It will be appreciated that the wall portion WP may act as an anti-reflecting Fabry-Perot resonator for radiation that propagates through the hollow core HC (and which may be incident on the wall portion WP at a grazing incidence angle). The thickness of the wall portion WP may be suitable so as to ensure that reflection back into the hollow core HC is generally enhanced whereas transmission into the capillary cavity CC is generally suppressed. In some embodiments, the capillary wall portion WP may have a thickness between 0.01-10.0 μm.

It will be appreciated that, as used herein, the term cladding portion is intended to mean a portion of the optical fiber OF for guiding radiation propagating through the optical fiber OF (i.e. the capillaries CAP which confine said radiation within the hollow core HC). The radiation may be confined in the form of transverse modes, propagating along the fiber axis.

The support portion is generally tubular and supports the six capillaries CAP of the cladding portion. The six capillaries CAP are distributed evenly around an inner surface if the inner support portion SP. The six capillaries CAP may be described as being disposed in a generally hexagonal formation.

The capillaries CAP are arranged so that each capillary is not in contact with any of the other capillaries CAP. Each of the capillaries CAP is in contact with the inner support portion SP and spaced apart from adjacent capillaries CAP in the ring structure. Such an arrangement may be beneficial since it may increase a transmission bandwidth of the optical fiber OF (relative, for example, to an arrangement wherein the capillaries are in contact with each other). Alternatively, in some embodiments, each of the capillaries CAP may be in contact with adjacent capillaries CAP in the ring structure.

The six capillaries CAP of the cladding portion are disposed in a ring structure around the hollow core HC. An inner surface of the ring structure of capillaries CAP at least partially defines the hollow core HC of the optical fiber OF. The diameter d of the hollow core HC (which may be defined as the smallest dimension between opposed capillaries, indicated by arrow d) may be between 10 and 1000 μm. The diameter d of the hollow core HC may affect the mode field diameter, impact loss, dispersion, modal plurality, and non-linearity properties of the hollow core HC optical fiber OF.

In this embodiment, the cladding portion comprises a single ring arrangement of capillaries CAP (which act as anti-resonance elements). Therefore, a line in any radial direction from a center of the hollow core HC to an exterior of the optical fiber OF passes through no more than one capillary CAP.

It will be appreciated that other embodiments may be provided with different arrangements of anti-resonance elements. These may include arrangements having multiple rings of anti-resonance elements and arrangements having nested anti-resonance elements. FIG. 9(a) shows an embodiment of HC-PCFs with three rings of capillaries CAP stacking on top of each other along the radial direction. In this embodiment, each capillary CAP is in contact with other capillaries both in the same ring and in a different ring. Furthermore, although the embodiment shown in FIG. 7 comprises a ring of six capillaries, in other embodiments, one or more rings comprising any number of anti-resonance elements (for example 4, 5, 6, 7, 8, 9, 10, 11 or 12 capillaries) may be provided in the cladding portion.

FIG. 9(b) shows a modified embodiment of the above discussed HC-PCFs with a single ring of tubular capillaries. In the example of FIG. 9(b) there are two coaxial rings of tubular capillaries 21. For holding the inner and outer rings of tubular capillaries 21, a support tube ST may be included in the HC-PCF. The support tube may be made of silica.

Figure 9:
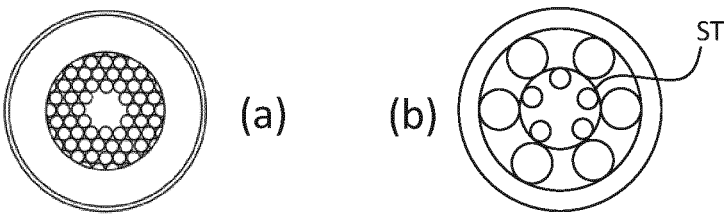
FIGS. 9 (a) and (b) schematically depict the transverse cross-sections of examples of hollow core photonic crystal fiber (HC-PCF) designs for supercontinuum generation.

The tubular capillaries of the examples of FIG. 7 and FIGS. 9 (a) and (b) may have a circular cross-sectional shape. Other shapes are also possible for the tubular capillaries, like elliptical or polygonal cross-sections. Additionally, the solid material of the tubular capillaries of the examples of FIG. 7 and FIGS. 9 (a) and (b) may comprise plastic material, like PMA, glass, like silica, or soft glass.

Figure 8:
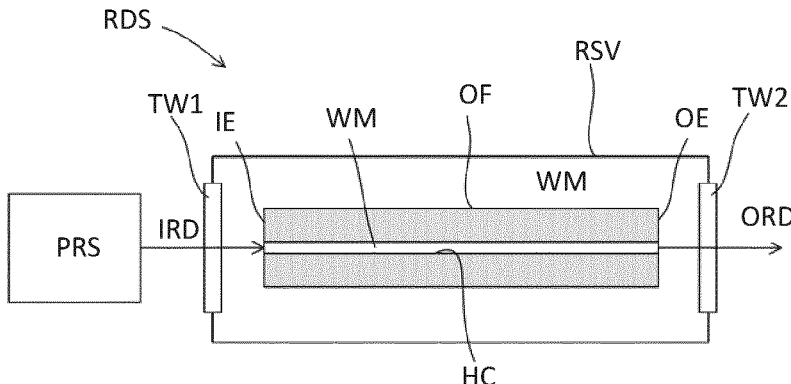
FIG. 8 depicts a schematic representation of a radiation source according to an embodiment for providing broadband output radiation.

FIG. 8 depicts a radiation source RDS for providing broadband output radiation. The radiation source RDS comprises a pulsed pump radiation source PRS or any other type of source that is capable of generating short pulses of a desired length and energy level; an optical fiber OF (for example of the type shown in FIG. 7) with a hollow core HC; and a working medium WM (for example a gas) disposed within the hollow core HC. Although in FIG. 8 the radiation source RDS comprises the optical fiber OF shown in FIG. 7, in alternative embodiments other types of hollow core HC optical fiber OF may be used.

The pulsed pump radiation source PRS is configured to provide input radiation IRD. The hollow core HC of the optical fiber OF is arranged to receive the input radiation IRD from the pulsed pump radiation source PRS, and broaden it to provide output radiation ORD. The working medium WM enables the broadening of the frequency range of the received input radiation IRD so as to provide broadband output radiation ORD.

The radiation source RDS further comprises a reservoir RSV. The optical fiber OF is disposed inside the reservoir RSV. The reservoir RSV may also be referred to as a housing, container or gas cell. The reservoir RSV is configured to contain the working medium WM. The reservoir RSV may comprise one or more features, known in the art, for controlling, regulating, and/or monitoring the composition of the working medium WM (which may be a gas) inside the reservoir RSV. The reservoir RSV may comprise a first transparent window TW1. In use, the optical fiber OF is disposed inside the reservoir RSV such that the first transparent window TW1 is located proximate to an input end IE of the optical fiber OF. The first transparent window TW1 may form part of a wall of the reservoir RSV. The first transparent window TW1 may be transparent for at least the received input radiation frequencies, so that received input radiation IRD (or at least a large portion thereof) may be coupled into the optical fiber OF located inside reservoir RSV. It will be appreciated that optics (not shown) may be provided for coupling the input radiation IRD into the optical fiber OF.

The reservoir RSV comprises a second transparent window TW2, forming part of a wall of the reservoir RSV. In use, when the optical fiber OF is disposed inside the reservoir RSV, the second transparent window TW2 is located proximate to an output end OE of the optical fiber OF. The second transparent window TW2 may be transparent for at least the frequencies of the broadband output radiation ORD of the apparatus 120.

Alternatively, in another embodiment, the two opposed ends of the optical fiber OF may be placed inside different reservoirs. The optical fiber OF may comprise a first end section configured to receive input radiation IRD, and a second end section for outputting broadband output radiation ORD. The first end section may be placed inside a first reservoir, comprising a working medium WM. The second end section may be placed inside a second reservoir, wherein the second reservoir may also comprise a working medium WM. The functioning of the reservoirs may be as described in relation to FIG. 8 above. The first reservoir may comprise a first transparent window, configured to be transparent for input radiation IRD. The second reservoir may comprise a second transparent window configured to be transparent for broadband output broadband radiation ORD. The first and second reservoirs may also comprise a sealable opening to permit the optical fiber OF to be placed partially inside and partially outside the reservoir, so that a gas can be sealed inside the reservoir. The optical fiber OF may further comprise a middle section not contained inside a reservoir. Such an arrangement using two separate gas reservoirs may be particularly convenient for embodiments wherein the optical fiber OF is relatively long (for example when the length is more than 1 m). It will be appreciated that for such arrangements which use two separate gas reservoirs, the two reservoirs (which may comprise one or more features, known in the art, for controlling, regulating, and/or monitoring the composition of a gas inside the two reservoirs) may be considered to provide an apparatus for providing the working medium WM within the hollow core HC of the optical fiber OF.

In this context a window may be transparent for a frequency if at least 50%, 75%, 85%, 90%, 95%, or 99% of incident radiation of that frequency on the window is transmitted through the window.

Both the first TW1 and the second TW2 transparent windows may form an airtight seal within the walls of the reservoir RSV so that the working medium WM (which may be a gas) may be contained within the reservoir RSV. It will be appreciated that the gas WM may be contained within the reservoir RSV at a pressure different to the ambient pressure of the reservoir RSV.

The working medium WM may comprise a noble gas such as Argon, Krypton, and Xenon, a Raman active gas such as Hydrogen, Deuterium and Nitrogen, or a gas mixture such as an Argon/Hydrogen mixture, a Xenon/Deuterium mixture, a Krypton/Nitrogen mixture, or a Nitrogen/Hydrogen mixture. Depending on the type of filling gas, the nonlinear optical processes can include modulational instability (MI), soliton self-compression, soliton fission, Kerr effect, Raman effect and dispersive wave generation (DWG), details of which are described in WO2018/127266A1 and U.S. Pat. No. 9,160, 137B1 (both of which are hereby incorporated by reference). Since the dispersion of the filling gas can be tuned by varying the working medium WM pressure in the reservoir RSR (i.e. gas cell pressure), the generated broadband pulse dynamics and the associated spectral broadening characteristics can be adjusted so as to optimize the frequency conversion In one implementation, the working medium WM may be disposed within the hollow core HC at least during receipt of input radiation IRD for producing broadband output radiation ORD. It will be appreciated that, while the optical fiber OF is not receiving input radiation IRD for producing broadband output radiation, the gas WM may be wholly or partially absent from the hollow core HC.

In order to achieve frequency broadening high intensity radiation may be desirable. An advantage of having a hollow core HC optical fiber OF is that it may achieve high intensity radiation through strong spatial confinement of radiation propagating through the optical fiber OF, achieving high localised radiation intensities. The radiation intensity inside the optical fiber OF may be high, for example due to high received input radiation intensity and/or due to strong spatial confinement of the radiation inside the optical fiber OF. An advantage of hollow core optical fibers is that they can guide radiation having a broader wavelength range that solid-core fibers and, in particular, hollow core optical fibers can guide radiation in both the ultraviolet and infrared ranges.

An advantage of using a hollow core HC optical fiber OF may be that the majority of the radiation guided inside the optical fiber OF is confined to the hollow core HC. Therefore, the majority of the interaction of the radiation inside the optical fiber OF is with the working medium WM, which is provided inside the hollow core HC of the optical fiber OF. As a result, the broadening effects of the working medium WM on the radiation may be increased.

The received input radiation IRD may be electromagnetic radiation. The input radiation IRD may be received as pulsed radiation. For example, the input radiation IRD may comprise ultrafast pulses, for example, generated by a laser.

The input radiation IRD may be coherent radiation. The input radiation IRD may be collimated radiation, an advantage of which may be to facilitate and improve the efficiency of coupling the input radiation IRD into the optical fiber OF. The input radiation IRD may comprise a single frequency, or a narrow range of frequencies. The input radiation IRD may be generated by a laser. Similarly, the output radiation ORD may be collimated and/or may be coherent.

The broadband range of the output radiation ORD may be a continuous range, comprising a continuous range of radiation frequencies. The output radiation ORD may comprise supercontinuum radiation. Continuous radiation may be beneficial for use in a number of applications, for example in metrology applications. For example, the continuous range of frequencies may be used to interrogate a large number of properties. The continuous range of frequencies may for example be used to determine and/or eliminate a frequency dependency of a measured property. Supercontinuum output radiation ORD may comprise for example electromagnetic radiation over a wavelength range of 100 nm-4000 nm. The broadband output radiation ORD frequency range may be for example 400 nm-900 nm, 500 nm-900 nm, or 200 nm-2000 nm. The supercontinuum output radiation ORD may comprise white light.

The input radiation IRD provided by the pulsed pump radiation source PRS may be pulsed. The input radiation IRD may comprise electromagnetic radiation of one or more frequencies between 200 nm and 2 μm. The input radiation IRD may for example comprise electromagnetic radiation with a wavelength of 1.03 μm. The repetition rate of the pulsed radiation IRD may be of an order of magnitude of 1 kHz to 100 MHz. The pulse energies may have an order of magnitude of 0.1 μJ to 100 μJ, for example 1-10 μJ. A pulse duration for the input radiation IRD may be between 10 fs and 10 ps, for example 300 fs. The average power of input radiation IRD may be between 100 mW to several 100 W. The average power of input radiation IRD may for example be 20-50 W.

The pulsed pump radiation source PRS may be a laser. The spatio-temporal transmission characteristics of such a laser pulse, e.g. its spectral amplitude and phase, transmitted along the optical fiber OF can be varied and tuned through adjustment of (pump) laser parameters, working component WM variations, and optical fiber OF parameters. Said spatio-temporal transmission characteristics may include one or more of: output power, output mode profile, output temporal profile, width of the output temporal profile (or output pulse width), output spectral profile, and bandwidth of the output spectral profile (or output spectral bandwidth). Said pulsed pump radiation source PRS parameters may include one or more of: pump wavelength, pump pulse energy, pump pulse width, pump pulse repetition rate. Said optical fiber OF parameters may include one or more of: optical fiber length, size and shape of the hollow core HC, size and shape of the capillaries, thickness of the walls of the capillaries surrounding the hollow core HC. Said working component WM, e.g. filling gas, parameters may include one or more of: gas type, gas pressure and gas temperature.

The broadband output radiation ORD provided by the radiation source RDS may have an average output power of at least 1 W. The average output power may be at least 5 W. The average output power may be at least 10 W. The broadband output radiation ORD may be pulsed broadband output radiation ORD. The broadband output radiation ORD may have a power spectral density in the entire wavelength band of the output radiation of at least 0.01 mW/nm. The power spectral density in the entire wavelength band of the broadband output radiation may be at least 3 mW/nm.

As described above, there are many nonlinear optical processes involved in generation of broadband output radiation ORD (e.g., supercontinuum or white light). Which nonlinear optical process has a more pronounced spectral broadening effect over the others will depend on how the operating parameters are set. For example, by selecting a pump wavelength and/or an optical fiber OF such that the pump pulse propagates through the fiber in a normal dispersion region (positive group velocity dispersion (GVD)), self-phase modulation is the dominant nonlinear optical process and is responsible for spectral expansion of the pump pulse. However in most cases, spectral broadening of input radiation IRD provided by the pulsed pump radiation source PRS is driven by soliton dynamics which require a pump pulse to propagate in an optical fiber OF in the anomalous dispersion region (negative GVD). This is because, in the anomalous dispersion region, the effects of Kerr nonlinearity and dispersion act in opposition to each other. When the pulse parameters of a pump pulse, which is launched into an optical fiber OF (e.g., HC-PCF) with anomalous chromatic dispersion, do not exactly match those of a soliton, the pump pulse will evolve into a soliton pulse with a certain soliton order and a dispersive wave.

It is known that soliton self-compression and modulation instability are the two primary mechanisms for spectral broadening in soliton driven broadband radiation generation. The distinction between the two mechanisms is that the soliton self-compression process is associated with low soliton orders whereas the modulation instability process is associated with high soliton orders. The soliton order N of the pulsed input radiation IRD is a convenient parameter that can be used to distinguish conditions under which spectral broadening is dominated by modulation instability and conditions under which spectral broadening is dominated by soliton self-compression. The soliton order N of the pulsed input radiation IRD is given by:

$$N = \sqrt{\gamma \frac{P_p \tau^2}{|\beta_2|}} \qquad (1)$$

where $\gamma$ is a nonlinear phase (or nonlinear parameter); $P_p$ is a pump peak power of the pulsed input radiation IRD; $\tau$ is a pump pulse duration of the pulsed input radiation IRD; and $\beta_2$ is the group-velocity dispersion of the working medium WM.

Spectral broadening is typically dominated by modulation instability when N>>20 whereas spectral broadening is typically dominated by soliton self-compression when N<<20.

Some known broadband radiation sources use arrangements which produce spectral broadening of pulsed pump radiation but wherein parameters of the pulsed pump radiation, the optical fiber and the working medium are configured to allow modulation instability to produce the spectral broadening. There are a number of reasons why modulation instability is used to produce the spectral broadening. First, modulation instability is known to produce broadband radiation having a relatively flat intensity-wavelength distribution, provided a sufficient number of pulses are averaged. Such a broadband radiation source may be referred to as a white light radiation source (due to the relatively flat spectral intensity distribution). Second, modulation instability can be achieved using relatively economical laser sources as the pump radiation source.

On the other hand, in the regime of soliton self-compression, an input pump pulse undergoes compression in the time domain, which is accompanied by an increase in a width of the spectrum. Following soliton self-compression, the compressed pulse undergoes soliton fission, wherein the pulse splits into a plurality of solitons. This soliton fission results in temporal broadening of the radiation pulse and a shifting of the spectrum.

As can be seen from equation (1), the soliton order of the input pulsed pump radiation 122 is proportional to the pulse duration $\tau$ of the pulsed input radiation IRD. Therefore, generally prior art arrangements wherein soliton self-compression dominates, typically the pulse duration $\tau$ of the input pulsed input radiation IRD is reduced to of the order of 30 fs or less. To realize such an arrangement, typically a compressed, high-power femtosecond-fiber lasers (e.g., fiber based chirped pulse amplification systems (FCPA)) or Ti:Sapphire amplifiers are used as the pulsed pump radiation source PRS. Such laser systems are relatively bulky (a femtosecond-fiber laser head has, for example, dimensions of 60×40×20 cm) and, in most cases, require external controllers and water chillers. In addition, such laser systems are relatively cost intensive.

The inventors have realized that the soliton order of the pulsed input radiation IRD can alternatively be reduced by reducing the pulse energy $E_p$ of the pulsed input radiation IRD (where $E_p = P_p \tau$). For example, if all other parameters remain constant, by reducing the pulse energy $E_p$ of the pulsed input radiation IRD by a factor of $\alpha$, the same soliton order can be achieved using a pulse duration that is increased by a factor of $\alpha$. This approach relaxes the requirement of short pulse durations (e.g., 30 fs or less) for soliton self-compression based spectral broadening. As a result, significantly longer pulse durations (e.g., 100 fs or more) and therefore more economical laser sources can be used for soliton self-compression.

In a soliton self-compression regime (with a relatively low soliton number), a pulse of input radiation IRD can undergo significant temporal compression, which is accompanied by spectral broadening. Eventually, the temporal compression will reach a maximal level (corresponding to a minimum temporal extent of the pulsed radiation) followed by temporal broadening of the radiation (soliton fission). The (higher order) soliton may oscillate between periods of temporal compression and temporal broadening as it propagates along the hollow core optical fiber. Following temporal broadening, other effects can lead to shifting of the spectrum of the radiation. For example, self-steepening (which may accompany and aid the soliton self-compression) can lead to an optical shock which can seed dispersive wave emission. By tuning the parameters of the system, a particular, desirable wavelength may be generated. For example, the wavelength may be selected so as to be suitable for interacting with a particular molecule and used in research experiments studying said molecule. Therefore, soliton self-compression is a known regime for generating from an input pump laser beam having first wavelength, an output radiation beam having a second, shifted wavelength.

Figure 10A:
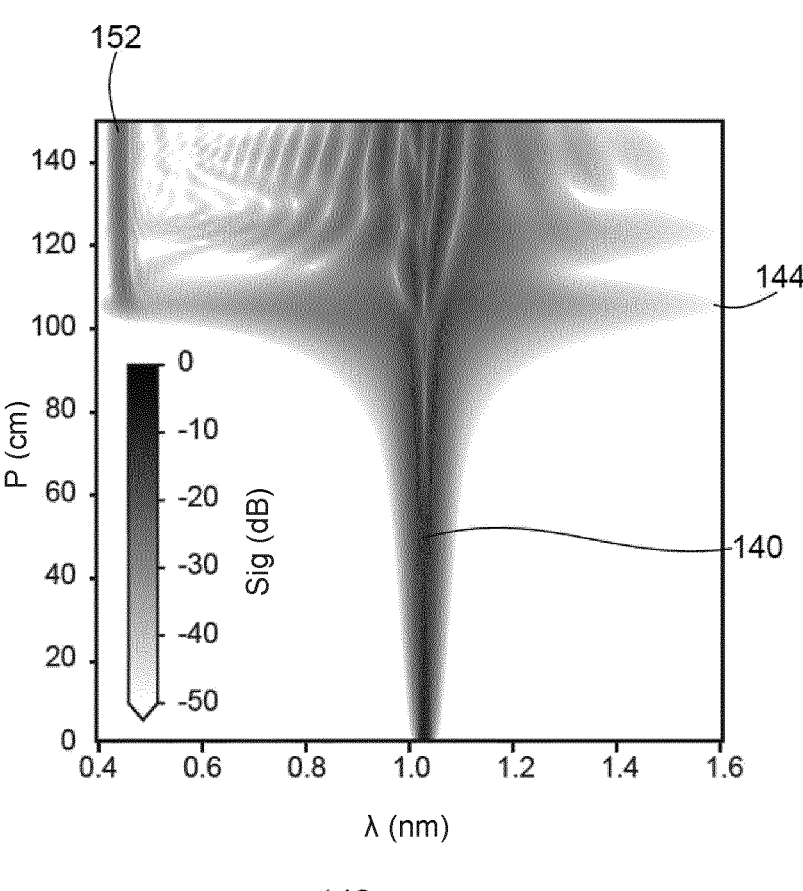
FIG. 10A shows a wavelength λ-power spectral density plot (or signal sig (dB)) against position P along the fiber length for a simulation, describing the soliton self-compression based spectral evolution of a pulse of radiation within the hollow core optical fiber of the radiation source shown in FIG. 8.

FIG. 10A shows a wavelength $\lambda$-power spectral density plot (or signal sig (dB)) against position P along the fiber length for a simulation, describing the soliton self-compression based spectral evolution of a pulse of radiation within the hollow core HC optical fiber OF of the radiation source RDS shown in FIG. 8. The hollow core HC optical fiber OF (e.g., a single ring HC-ARF as illustrated in FIG. 7) has a length of 150 cm and a core diameter of 32.5 μm. The hollow core HC may be filled with a working medium WM of Krypton gas at a pressure of 10 bar. In this example, the pulsed input radiation IRD has a pump pulse duration of $\tau$ of 150 fs, a pulse energy $E_p$ of 0.4 μJ energy and a wavelength $\lambda$ of 1030 nm. This pulse energy $E_p$ is approximately one order of magnitude lower than in currently used in modulation instability driven broadband light sources. This configuration allows pumping in the anomalous dispersion regime ($\beta_2 = -6.3$ fs²/cm at the pump wavelength of 1030 nm). The soliton order of N=17 allows soliton self-compression of the pulsed input radiation IRD so as to change a spectrum of the pulsed pump radiation so as to form broadband output radiation ORD.

Figure 10B:
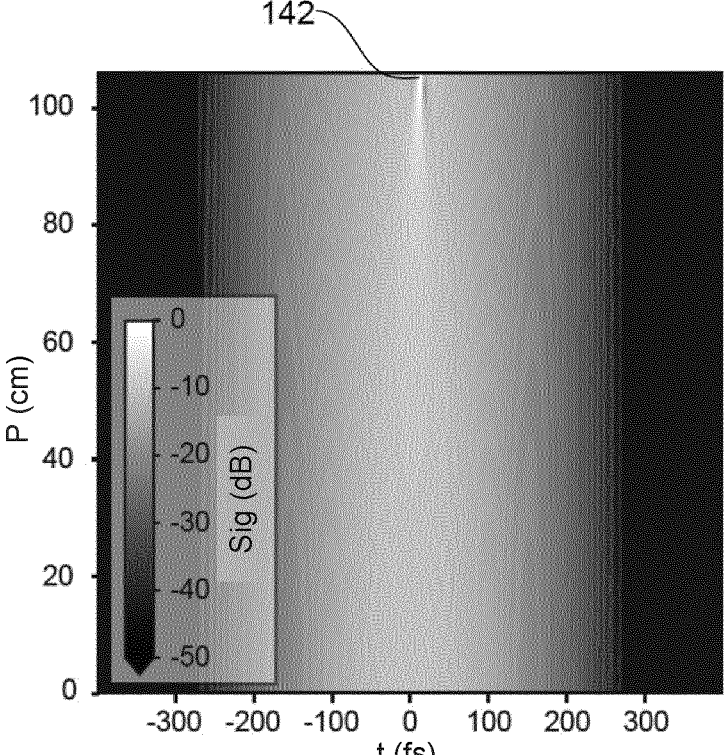
FIG. 10B shows a time t-power spectral density plot (or signal sig (dB)) against position P along the fiber length for a simulation, describing the soliton self-compression based temporal evolution of the pulse of radiation within the hollow core optical fiber (up to the maximum compression point) of the same radiation source.

With reference to FIG. 10A, in a first portion of the hollow core HC optical fiber OF (e.g., between the input end IE of the fiber OF and a position approximately 100 cm from the input end IE), the input radiation IRD undergoes self-phase modulation 140 which continuously broadens the spectrum of the input radiation IRD. This is followed by soliton self-compression 142, as shown in FIG. 10B, a temporal extent of the input radiation IRD being minimal at a distance of approximately 110 cm from the input end IE of the hollow core HC optical fiber OF. The soliton self-compression is accompanied by significant broadening 144 of the spectrum of the radiation. That is to say, while the temporal extent of the input radiation IRD is minimal, the breadth of the spectrum of the input radiation IRD is maximal.

Generally, after the soliton self-compression, the breadth of the spectrum of the pulsed input radiation IRD may decrease and/or gaps in the spectrum may develop (for example as the soliton evolves and as dispersive waves are emitted). It can be seen in FIG. 10A that following the soliton self-compression and associated spectral broadening 144, the spectrum of radiation undergoes a number of changes. For example, a dispersive wave 152 is emitted and, the radiation oscillates between periods of spectral compression and spectral broadening.

Figures 11A, 11B:
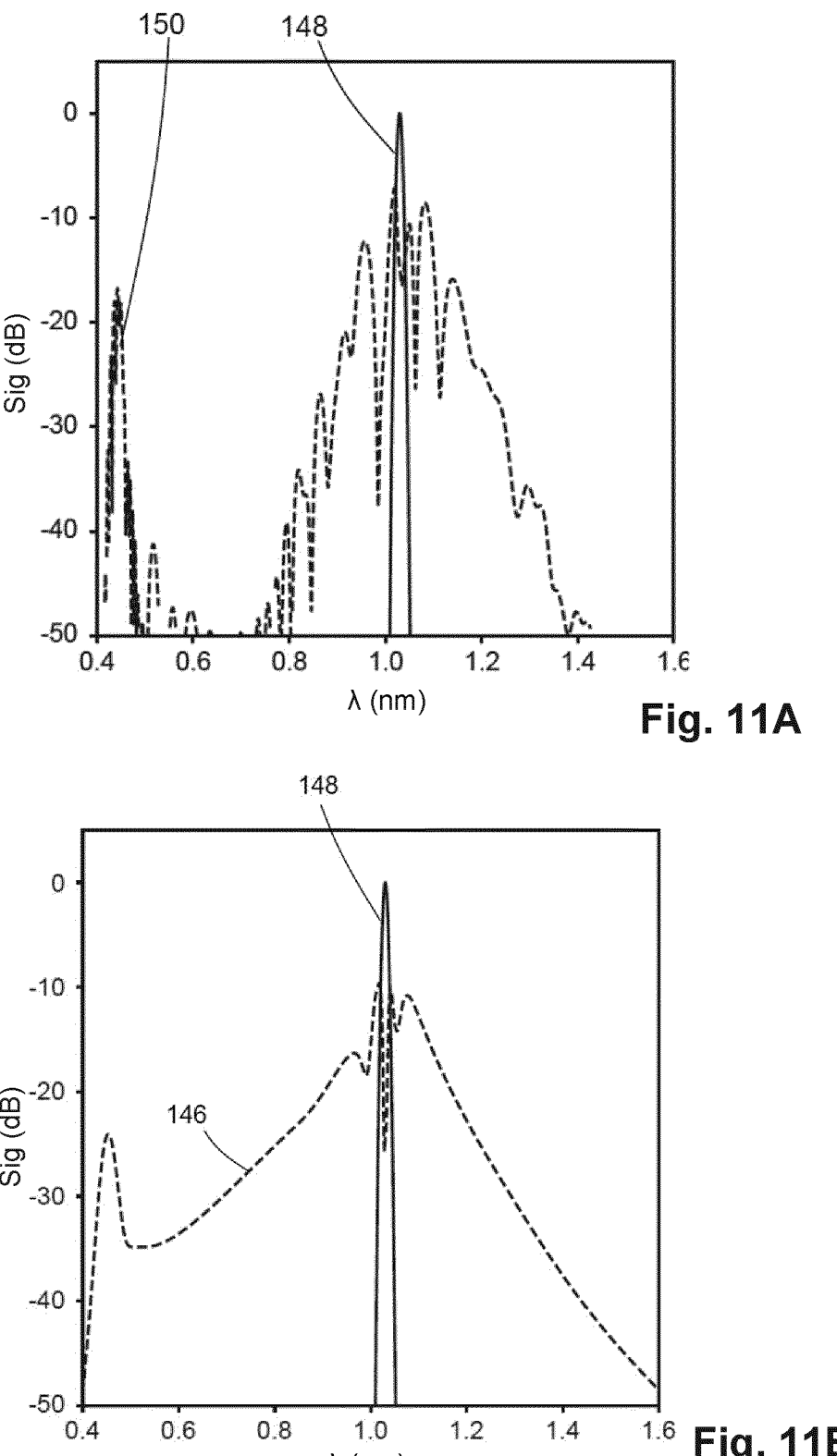
FIG. 11A shows a simulation of an output spectrum of the radiation source based on which the simulation shown in FIG. 10A or 10B is generated.
FIG. 11B shows a simulation of a spectrum of the pulsed input radiation at the maximum compression point.

FIG. 11A shows a simulation of an output spectrum 150 of the radiation source RDS as may be generated by the simulation illustrated by FIG. 10A. Also shown is the spectrum 148 of the pulsed input radiation IRD. It can clearly be seen from the output spectrum 150 that the spectrum is not smooth, having a number of peaks and troughs.

The inventors have realized that during soliton self-compression, before the temporal broadening (and before any dispersive waves are formed), there is a (short-lived) transition period during which the radiation propagating through the hollow-core fiber is broadband radiation (i.e. having a broad, relatively flat spectrum with no significant gaps in the spectral density spectrum). Furthermore, the inventors have realized that, although this broadband radiation is short lived, by selecting the length of the optical fiber 100 such that the output end 112 substantially coincides with a position at which the soliton self-compression has occurred but before subsequent temporal broadening and shifting of the spectrum, this broadband radiation can be output from the optical fiber 100 so as to provide a particularly stable broadband radiation source 134.

FIG. 11B shows a simulation of a spectrum 146 at the maximum compression point (the position where the breadth of the spectrum of the input radiation IRD is maximal or where the temporal extent input radiation IRD is minimal) In comparison with spectrum 150 shown in FIG. 11A, the spectrum 146 has a smoother and flatter spectral profile. The comparison further confirms that a more stable (for example against pulse to pulse variation) and flat broadband radiation source can be provided if the length of the optical fiber 100 is such that the output end 112 substantially coincides with a position at which a breadth of the spectrum of the radiation is maximal.

In contrast to the noise-seeded modulation instability systems, broadband radiation generated by such soliton self-compression will have substantially no shot-to-shot variations. As a result, advantageously, a stable output spectrum can be generated using a single pulse. In contrast, several pulses would be required to produce some stability in the output beam of a modulation instability system.

In many applications that require broadband output radiation ORD, such as the aforementioned metrology applications, there is a growing interest in further flattening the output spectrum of broadband output radiation ORD, in particular in the wavelength region between 500 nm to 900 nm. Even though the aforementioned soliton self-compression method (i.e. coinciding the output end of an optical fiber with the maximum compression point) is useful for ensuring a smoother and flatter broadband output spectrum, the flatness of the broadband spectrum (e.g., the spectrum 146) may still be improved upon further. Hence, in this disclosure, methods and apparatuses are proposed to further improve the spectral flatness of the broadband output radiation ORD generated in the soliton self-compression regime.

Figure 12A:
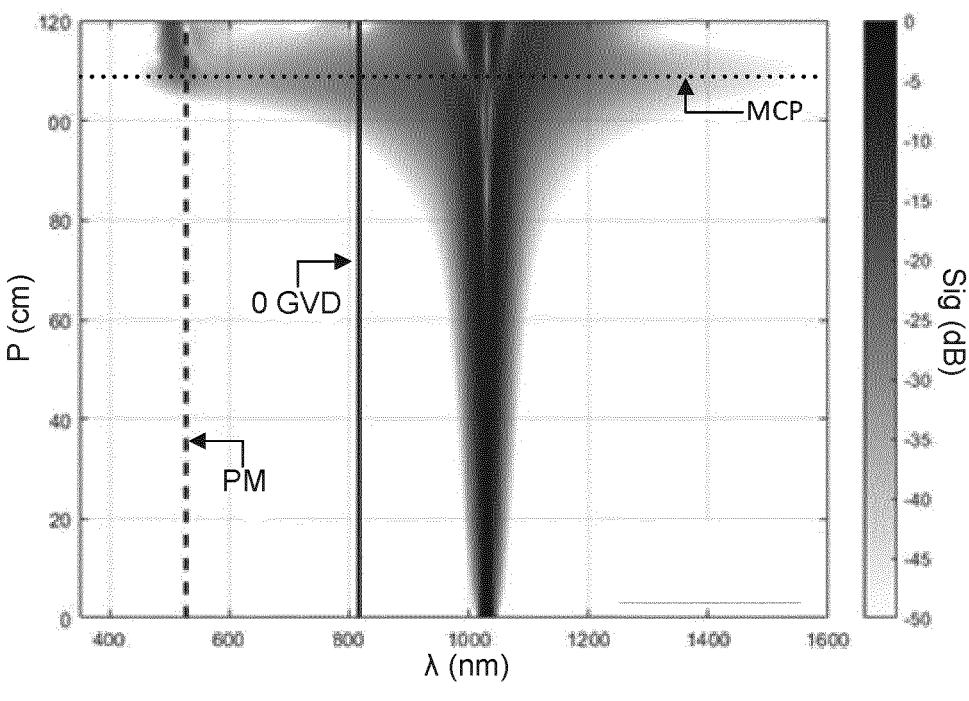
FIG. 12A shows another wavelength λ-power spectral density (or signal sig (dB)) plot against position P along the fiber length for a simulation, describing the soliton self-compression based spectral evolution of a pulse of input radiation within the hollow core optical fiber of the radiation source shown in FIG. 8.

FIG. 12A shows another wavelength $\lambda$-power spectral density (or signal sig (dB)) plot against position P along the fiber length for a simulation, describing the soliton self-compression based spectral evolution of a pulse of input radiation IRD within the hollow core HC optical fiber OF of the radiation source RDS shown in FIG. 8. The hollow core HC optical fiber OF may be for example a single ring HC-ARF as illustrated in FIG. 7. The optical fiber OF has a length of 120 cm (between the input end IE and the output end OE of the fiber) and a core diameter of 32.5 μm. The capillary wall portion WP has a thickness of 0.16 μm. The hollow core HC of the optical fiber OF is filled with a working medium WM of Krypton gas at a pressure of 14 bar and an operating temperature of 298 K. The pulsed input radiation IRD has a pump pulse duration of $\tau$ of 153 fs, a pulse energy $E_p$ of 0.275 μJ energy and a wavelength $\lambda$ of 1030 nm. The repetition frequency of the pulsed input radiation IRD is 10.2 MHz. The pulsed input radiation IRD is coupled into the hollow core HC via the input end IE and the output radiation ORD exits the optical fiber OF via the output end OE. This purely exemplary set of operating parameters has been chosen to enable spectral broadening in the soliton self-compression regime.

As shown in the figure, the solid line 0 GVD indicates the wavelength at which group velocity dispersion is zero. Since the wavelength of the input radiation IRD (e.g., 1030 nm) is longer than the 0 GVD wavelength (e.g., about 820 nm), the input radiation is subject to anomalous dispersion in the gas-filled hollow core HC of the fiber T-OF. The maximum compression point, as indicated by the dotted line MCP, coincides with a position approximately 108 cm from the input end IE of the optical fiber OF. At the maximum compression point, the breadth of the spectrum of the input radiation IRD is maximal and the wavelengths generated at the shorter end of the spectrum correspond to a dispersive wave. The dispersive wave is generated whenever the phase matching condition between the dispersive wave and the spectrally broadened input radiation is fulfilled. The dashed line PM indicates the phase matching wavelength for the dispersive wave, which remains the same while the input radiation traverses the optical fiber OF. The continuing propagation of the input radiation IRD from the maximum compression point to the output end OE of the optical fiber OF results in continuous growth in the energy of the dispersive wave and thus a more spiky spectral profile, consistent with the simulation shown in FIG. 10A.

Figure 12B:
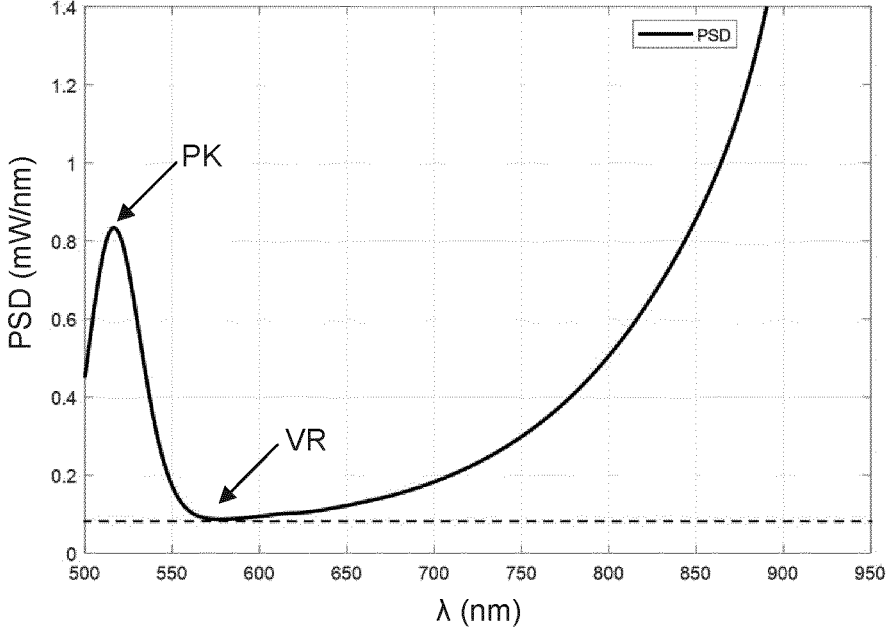
FIG. 12B shows a power spectral density plot of a spectrum of the pulsed input radiation at the maximum compression point simulated with the same parameters as the simulation shown in FIG. 12A.

FIG. 12B shows a power spectral density PSD plot of a spectrum of the pulsed input radiation IRD at the maximum compression point simulated with the same parameters as the simulation shown in FIG. 12A. The x-axis is the wavelength $\lambda$ of the input radiation IRD spectrally broadened in the above discussed self-compression regime. The y-axis represents an amount of power per nanometer of the spectrally broadened radiation. As shown in the figure, the spectrum has a relatively high peak PK in the wavelength region of the generated dispersive wave and has a relatively low valley VR immediately after the peak PK. In this particular case, the peak PK centers around 520 nm and the valley VR dips around 570 nm. The power spectral density of the peak PK (e.g., about 0.82 mW/nm) is more than 10 times higher than the power spectral density of the trough of the valley VR (e.g., about 0.08 mW/nm). It is also seen that the dispersive wave peak PK is very sensitive to the energy noise of the pump pulse—small variations in the pump pulse energy immediately results in large output intensity differences at the wavelengths of the dispersive wave. Consequently, pulse energy noise of the pump laser may result in high pulse-to-pulse variations of the height of the peak PK. For example, based on the same operating parameters used in the simulation shown in FIG. 12A, the inventors have found that a 3.7% variation in pulse energy can be significantly "amplified" to a more than 330% variation in the intensity of the dispersive wave peak PK.

The inventors have realized that the radiation source RDS can be configured to apply at least one dispersion control mechanism in at least one portion of the gas-filled optical fiber OF. Preferably, the at least one dispersion control mechanism is applied to a first portion of the optical fiber OF, wherein a first end of the first portion of the optical fiber is located at or near a position along the length of the optical fiber where the spectrum of the input radiation IRD reaches the maximum breadth and a second end of said first portion of the optical fiber is located at or near the output end of the optical fiber. The optical fiber OF may further comprise a main portion which may comprise a relatively constant core diameter and which may comprise a first end which coincides with the input end of the optical fiber and a second end located at a position along the length of the optical fiber where the spectrum of the input radiation IRD reaches the maximum breadth. Such at least one dispersion control mechanism may be able to change the net dispersion inside the fiber and hence allow for adjustment of the phase-matching conditions of the dispersive wave. For example, the application of at least one dispersion control mechanism may result in continuous red-shifting of the phase matching wavelength of the dispersive wave and thus overlapping between the dispersive wave and the valley region VR of the spectrum of the spectrally broadened input radiation. By carefully adjusting the phase matching wavelength along the length of the first portion, a desired power spectral density PSD profile of the dispersive wave that is, to some extent, complementary to the power spectral density PSD profile of the spectrum of the input radiation IRD in the valley region VR may be obtainable. In such a manner, the valley region VR may be filled with energy from the overlapping dispersive wave which is continuously fueled by the pump radiation insofar as the phase matching condition is fulfilled. Consequently, the power spectral density PSD of the trough of the valley VR as well as the flatness of the output spectrum of the broadband output radiation ORD can both be improved.

In some embodiments, the dispersion control mechanism may be embodied as a tapered portion of the hollow core HC optical fiber OF starting immediately after the maximum compression point. Depending on the initial dispersion characteristics to which the input radiation IRD is subjected in the gas-filled hollow core HC, the tapered portion of the optical fiber OF may comprise at least one tapering-up section wherein the structural dimensions (e.g., core diameter) of the optical fiber OF continuously increase along the axial direction or the length of the optical fiber OF, at least one tapering-down sections wherein the structural dimensions (e.g., core diameter) of the optical fiber OF continuously decrease along the axial direction or the length of the optical fiber OF, or a combination thereof.

Fiber tapering is known as a useful technique for modifying local properties (e.g., increasing or decreasing the core diameter) of an optical fiber OF such that different optical characteristics can be obtained. Fiber tapering may be applied in a post-processing step after manufacturing the optical fiber OF. Typically, tapered fibers are fabricated by heating a fiber (e.g., scanning a heat source or oxy-butane flame along the length of a fiber) while applying a pressure from the inside of the fiber core, or from the outside of the fiber core. Precise control of the pressure applied to the heated area during the tapering process allows production of arbitrary taper profiles and waist lengths. The publication, R. Pennetta et al., "Fabrication and non-destructive characterization of tapered single-ring hollow-core photonic crystal fiber," APL Photonics 4, 056105 (2019), incorporated herein by reference, discloses that single-ring HC-PCF can be tapered using the standard flame brush technique by selectively evacuating the regions outside the capillaries so as to balance surface tension. In the following embodiments, hollow core HC optical fibers OF may be tapered in an adiabatic manner such that propagation of the fundamental mode is substantially maintained through the tapered fiber.

Figure 13A:
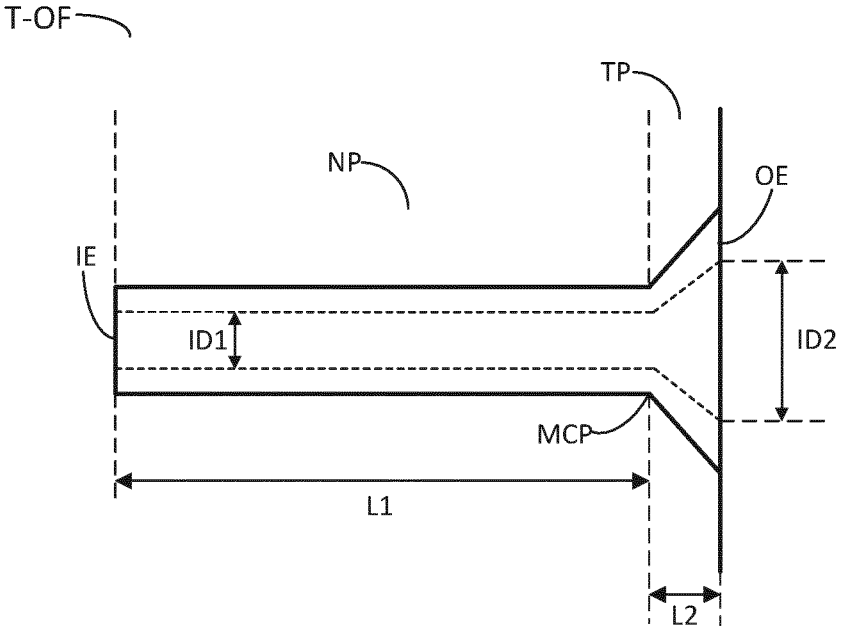
FIG. 13A depicts schematically a first tapered hollow core optical fiber in accordance with an embodiment.

FIG. 13A depicts schematically a first tapered hollow core optical fiber T-OF in accordance with an embodiment. The tapered hollow core optical fiber T-OF may comprise an un-tapered fiber portion NP (corresponding to the above-described main portion) with a length of L1 and a tapered fiber portion TP with a length of L2 (corresponding to the above-described first portion). The two fiber portions NP, TP may meet at the maximum compression point MCP (the position where the breadth of the spectrum of the input radiation IRD is maximal or where the temporal extent input radiation IRD is minimal) In this embodiment, the tapered portion TP may comprise a single tapering-up section starting immediately after the maximum compression point MCP and ending at the output end OE of the tapered hollow core optical fiber T-OF. In the un-tapered portion NP, the structural dimensions (e.g., core diameter, capillary diameter, and capillary wall thickness) may stay substantially the same. By contrast, in the tapered portion TP, the structural dimensions of the tapered hollow core optical fiber T-OF may continuously increase along the axial direction or the length of the fiber. For example, in the tapered portion TP, the fiber core diameter may continuously increase from a first core diameter ID1 to a second core diameter ID2. Such a tapered portion TP may also be referred to as an "up-taper". The continuous increasing of the core diameter in the tapered fiber portion TP may have at least two effects on spectral evolution of the input radiation: 1) continuously decreasing the nonlinearities in the tapered fiber portion TP; 2) continuously red-shifting the 0 GVD wavelength, i.e. continuously shifting the 0 GVD wavelength to longer wavelengths.

Figure 13B:
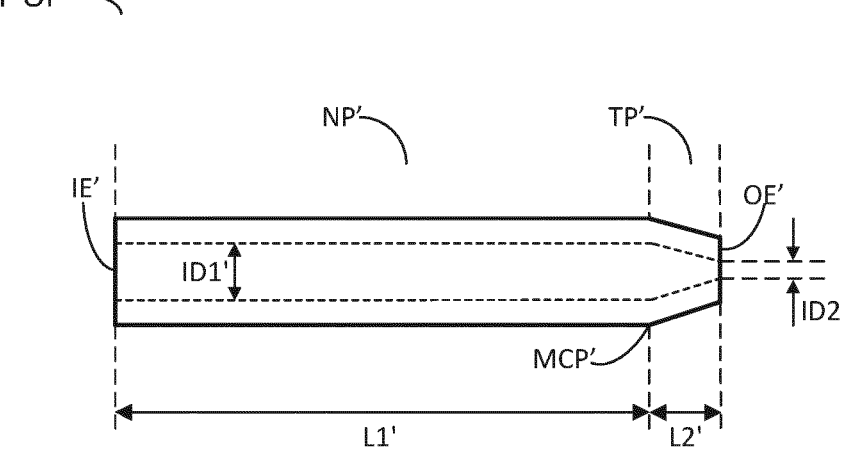
FIG. 13B depicts schematically a second tapered hollow core optical fiber in accordance with an embodiment.

FIG. 13B depicts schematically a second tapered hollow core optical fiber T-OF' in accordance with an embodiment. The tapered hollow core optical fiber T-OF' may comprise an un-tapered fiber portion NP' with a length of L1' and a tapered fiber portion TP' with a length of L2'. The two fiber portions NP', TP' may also meet at the maximum compression point MCP'. In this embodiment, the tapered portion TP' may comprise a single tapering-down section starting immediately after the maximum compression point MCP' and ending at the output end OE' of the hollow core optical fiber T-OF'. In the un-tapered portion NP', the structural dimensions (e.g., core diameter, capillary diameter, and capillary wall thickness) may stay substantially the same. By contrast, in the tapered portion TP', the structural dimensions of the tapered hollow core optical fiber T-OF' may continuously decrease along the axial direction or the length of the fiber. For example, in the tapered portion TP, the fiber core diameter may continuously decrease from a first core diameter ID1' to a second core diameter ID2'. Such a tapered portion TP may also be referred to as a "down-taper". The continuous decreasing of the fiber core diameter in the tapered fiber portion TP' may have at least two effects on spectral evolution of the input radiation: 1) continuously increasing the nonlinearities in the tapered fiber portion TP; 2) continuously blue-shifting the 0 GVD wavelength, i.e. continuously shifting the 0 GVD wavelength to shorter wavelengths.

Note that at the maximum compression point MCP, MCP' where the two fiber portions meet, the structural dimensions (e.g., core diameter) of the un-tapered portion NP, NP' and the tapered portion TP, TP' are substantially the same. The rate at which the structural dimensions, e.g., the core diameter, decrease or increase may depend on the tapering process, e.g., the rate at which the fiber is pulled during tapering. Note that, the above-mentioned fiber parameters are example parameters which may be appropriate specifically for a tapered single-ring HC-ARF. Other different types of optical fibers may comprise different or additional fiber parameters. For example, in some embodiments, the optical fiber may comprise a different type of HC-ARF such as a Kagome fiber, the cladding structure of which comprises a set of concentric hexagonal annuli. In such a case, the capillary diameter described above may be replaced with a distance between two opposing edges of a hexagonal annulus.

In some embodiments, the un-tapered hollow core HC optical fiber OF may comprise one of the aforementioned HC-PCFs, e.g., a single ring HC-ARF as illustrated in FIG. 7. When used for generation of broadband output radiation ORD, the tapered hollow core optical fiber T-OF, T-OF' may be comprised in a broadband radiation source RDS shown in FIG. 8. In some embodiments, the tapered hollow core optical fiber T-OF, T-OF' may be filled with a noble gas or a noble gas dominated mixture. As described above, the broadband radiation source may be configured such that the soliton self-compression process is the dominant nonlinear process for spectral broadening of the input radiation IRD in the gas-filled tapered optical fiber T-OF, T-OF'.

Figure 14A:
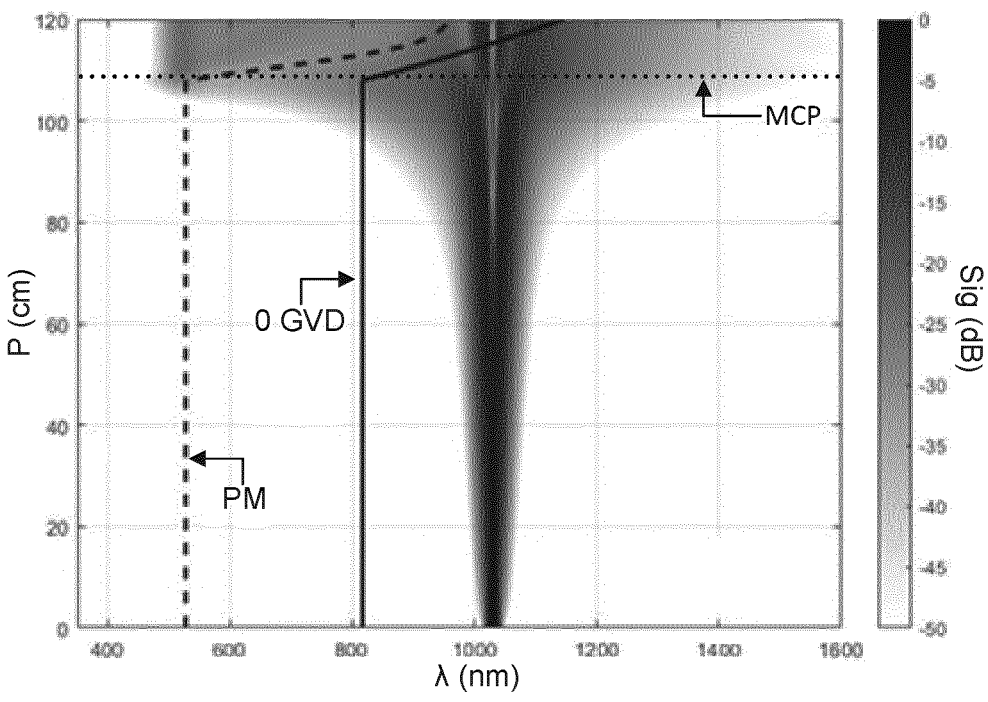
FIG. 14A shows a wavelength λ-power spectral density (or signal sig (dB)) plot against position P along the fiber length for a simulation, describing the spectral evolution of a pulse of input radiation within the tapered hollow core optical fiber shown in FIG. 13A.

FIG. 14A shows a wavelength λ-power spectral density (or signal sig (dB)) plot against position P along the fiber length for a simulation, describing the spectral evolution of a pulse of input radiation IRD within the tapered hollow core optical fiber T-OF shown in FIG. 13A. In the embodiment, the tapered hollow core optical fiber T-OF may be comprised within the radiation source RDS shown in FIG. 8. The tapered optical fiber T-OF which consists of the un-tapered portion NP and the tapered portion TP has, in this example, a full length of 120 cm (between the input end IE and the output end OE of the fiber). The length of the un-tapered portion NP may be 108 cm (between the input end IE and the maximum compression point MCP) and the length of the tapered portion TP is 12 cm (between a position immediately after the maximum compression point MCP and the output end OE of the fiber). The core diameter ID1 in the un-tapered portion NP is 32.5 μm. The capillary wall portion WP in the un-tapered portion NP has a thickness of 0.16 μm.

The fiber core diameter in the tapered portion TP continuously increases from the first core diameter ID1 of 32.5 μm to the second core diameter ID2 of 65 μm. The hollow core HC of the tapered optical fiber T-OF is filled with a working medium WM of Krypton gas at a pressure of 14 bar and an operating temperature of 298 K. The pulsed input radiation IRD has a pump pulse duration of τ of 153 fs, a pulse energy E p of 0.275 μJ energy and a wavelength λ of 1030 nm. The repetition frequency of the pulsed input radiation IRD is 10.2 MHz. Of course, all these values are purely exemplary. The pulsed input radiation IRD is coupled into the hollow core HC via the input end IE and the output radiation ORD exits the tapered optical fiber T-OF via the output end OE.

For comparison with the simulation shown in FIG. 12A, the simulation shown in FIG. 14A uses the same set of operating parameters which enable spectral broadening in the soliton self-compression regime. Since the un-tapered portion NP of the tapered hollow core optical fiber T-OF is the same as the hollow core HC optical fiber OF used in the simulation shown in FIG. 12A, the maximum compression point MCP simulated in FIG. 14A remains at the same position, i.e. a position approximately 108 cm from the input end of the fiber. The main difference between the two simulations lies in the fiber portion after the maximum compression point MCP: in the simulation shown in FIG. 12A, the fiber portion after the maximum compression point MCP remains the same whereas in the simulation shown in FIG. 14A, the fiber portion after the maximum compression point MCP comprises a tapered portion, e.g., a single tapering-up section. As a result of the application of fiber tapering in the tapered portion TP, the 0 GVD wavelength undergoes a continuous red-shift as the distance to the maximum compression point MCP increases. Similarly, the PM wavelength of the dispersive wave also undergoes a continuous red-shift as the distance to the maximum compression point MCP increases.

Referring back to FIG. 14A, the continuous increasing of the fiber core diameter results in the 0 GVD wavelength being shifted from about 820 nm at the fiber position with which the maximum compression point MCP coincide to about 1140 nm at the output end of the fiber. The continuous red-shifting of the 0 GVD wavelength and the phase matching condition of the dispersive wave (e.g., the dispersive wave centered around 520 nm shown in FIG. 12B) prevent the dispersive wave from growing significantly beyond the maximum compression point along the length of the fiber. As described above, the continuous red-shifting of the phase matching condition for the dispersive wave shifts the wavelength of the dispersive wave towards the valley region VR of the spectrum of the input radiation IRD and facilitates the overlapping between the dispersive wave and valley region VR. By optimizing the fiber tapering (e.g., the rate at which the fiber core diameter increases), it is possible to generate a desired power spectral density profile of the dispersive wave that is, to some extent complementary, to the power spectral density profile of the spectrum of the input radiation IRD in the valley region VR. As such, the difference in power spectral density between the peak of the dispersive wave (e.g., the peak PK around 520 nm in FIG. 12B) and the minimum of the valley (e.g., the valley VR around 570 nm in FIG. 12B) can be significantly reduced and a much flatter spectral profile in the wavelength region between 500 nm to 900 nm can be obtained.

Figure 14B:
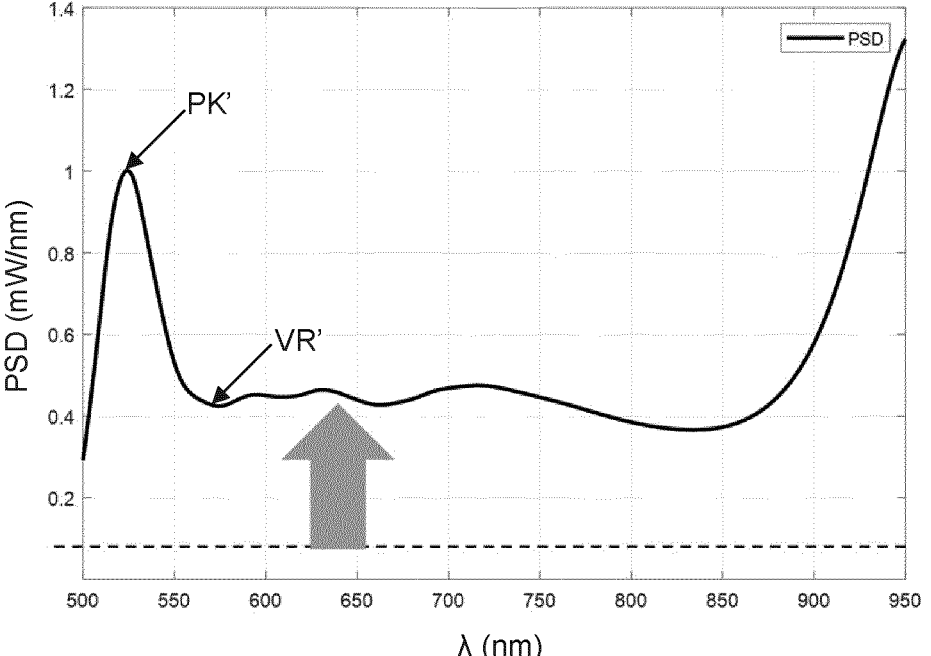
FIG. 14B shows a power spectral density plot of an output spectrum of the radiation source simulated with the same parameters as the simulation shown in FIG. 14A.

FIG. 14B shows a power spectral density plot of an output spectrum of the radiation source simulated with the same parameters as the simulation shown in FIG. 14A. As can be seen in the plot, the power spectral density of the dispersive wave peak PK' is around 1.0 mW/nm and the power spectral density of the trough of the valley VR' is around 0.42 mW/nm. In comparison with the spectrum simulated with the same parameters but at the maximum compression point (e.g., as shown in FIG. 12B), the trough of the valley VR' has a much higher power spectral density of 0.42 mW/nm (as opposed to 0.08 mW/nm in the spectrum shown in FIG. 12B) and in addition, the output spectrum has a much flatter spectral profile with a peak/valley ratio of 2.38 (as opposed to more than in the spectrum shown in FIG. 12B). In either case, the application of a tapered fiber portion after the maximum compression point gives at least a factor of 4 improvement. By selectively attenuating the dispersive wave peak PK', it is thus possible to obtain a reasonably flat spectrum with a reasonably good power spectral density (e.g., around 0.4 mW/nm) across the full wavelength range between 500 nm and 900 nm. Furthermore, the application of a tapered fiber portion after the maximum compression point also significantly reduces the sensitivity of the peak PK' of the dispersive wave to the pulse energy variations.

The dispersion control mechanism applied for improving the spectral flatness of the broadband output radiation may not be restricted to a tapered fiber portion, as described in the foregoing embodiments. In alternative embodiments, the dispersion control mechanism may comprise a pressure gradient arrangement operable to apply a pressure gradient PGD inside the fiber core of a portion of the optical fiber OF. Preferably, the pressure gradient PGD is applied in a fiber portion starting immediately after the maximum compression point.

FIGS. 15A and 15B depicts respectively an optical fiber OF used for generating broadband output radiation ORD and an example pressure profile PPR applied for improving the spectral flatness of the broadband output radiation generated in the optical fiber OF. As can be seen in the figures, the pressure profile PPR may comprise two parts: the first part represents a constant pressure CPR that is applied in a first portion FP of the optical fiber OF; the second part represents a pressure gradient GPR that is applied in a second portion SP of the optical fiber OF. The first portion FP with a length of L1" may start from the input end IE" of the optical fiber OF and end at the position with which the maximum compression point MCP" coincide. The second portion SP with a length of L2" may start from a position immediately after the maximum compression point MCP" and end at the output end OE" of the optical fiber OF. The optical fiber OF shown in FIG. 15A may comprise one of the aforementioned HC-PCFs, e.g., a single ring HC-ARF as illustrated in FIG. 7.

In comparison with the embodiments shown in FIGS. 13A and 13B, the optical fiber OF does not comprise any tapered portion and hence its core diameter ID" remains relatively constant through the full length of the fiber. When used for generation of broadband output radiation ORD, the optical fiber OF may be comprised in a broadband radiation source RDS configured differently to that shown in FIG. 8. The pressure profile PPR may be generated by means of multiple pressure sources that are connected to the hollow core HC of the optical fiber OF. In some configurations, the pressure profile PPR may be generated by means of three pressure sources (not shown): a first pressure source being connected to the hollow core HC at the input end IE" of the fiber, a second pressure source being connected to the hollow core HC at the maximum compression point MCP" and a third pressure source being connected to the hollow core HC at the output end OE" of the fiber. In addition, multiple pressure sensors (not shown) may be placed at different positions along the fiber length in order to monitor the local pressure inside the hollow core HC. The first pressure source may be operable to maintain a substantially constant pressure CPR within the first portion FP while the second and third pressure sources may be configured such that the pressure within the second portion SP of the fiber continuously increases (e.g., the pressure gradient GPR shown in FIG. 15B) or decreases with the fiber length. Similar to the embodiment shown in FIG. 13A, applying a positive pressure gradient (the pressure inside the fiber core increases with the fiber length) may also result in a continuous red-shift of the 0 GVD wavelength. However, rather than decreasing the nonlinearities as a consequence of increasing the core diameter, the increasing of the pressure causes an increase of the nonlinearities of the gas-filled fiber. Hence, a careful optimization of the pressure profile PPR may be performed in order to flatten the output spectrum of the broadband output radiation ORD while maintaining the operation in the soliton self-compression regime.

In different configurations, the input end IE" of the optical fiber OF may be enclosed in a first pressure chamber and the output end OE" of the optical fiber OF may be enclosed in a second pressure chamber. The pressure of each of the two chambers may be set at a different (desired) level such that an increasing or a decreasing pressure gradient is obtained through the whole length of the fiber. In other configurations, more than three pressure sources may be connected to the hollow core HC of the optical fiber OF such that a more complex multi-part pressure profile PPR is created. In the context of this application, the pressure gradient GPR is selected such that broadband output radiation ORD is generated in the soliton self-compression regime. By applying an optimized pressure profile, it is possible to reach the similar effects as those achieved by means of a tapered optical fiber T-OF, T-OF'.

In alternative embodiments, the dispersion control mechanism may comprise a temperature gradient arrangement being operable to apply a temperature gradient in the fiber core of a portion of the optical fiber OF. Preferably, the temperature gradient is applied in a fiber portion starting immediately after the maximum compression point. The working medium may be subject to such a temperature gradient in the portion of the optical fiber. FIG. 15C depicts schematically an example temperature profile TPR applied for improving the spectral flatness of the broadband output radiation generated in the optical fiber OF shown in FIG. 15A. Similar to the pressure profile PPR shown in FIG. 15B, the temperature profile TPR may also comprise two parts: the first part represents a constant temperature that is applied to the first portion FP of the optical fiber OF; the second part represents a temperature gradient that is applied to the second portion SP of the optical fiber OF. The temperature profile TPR may represent the temperature of the working medium along the optical fiber OF and may be generated by for example attaching one or more temperature controlling elements (e.g., thermoelectric cooler (TEC) elements) to one or more locations of the outer surface of the optical fiber OF. The temperature gradient GTE may comprise either a positive temperature gradient (the temperature of the fiber increases with the fiber length) or a negative temperature gradient (the temperature of the fiber decreases with the fiber length). To cause a continuous red-shift of the 0 GVD wavelength, a negative temperature gradient may be applied to the second portion SP of the optical fiber OF. Similarly, a careful optimization of the temperature profile TPR may be needed in order to flatten the output spectrum of the broadband output radiation ORD while maintaining the operation in the soliton self-compression regime.

It should be appreciated that one or more of the tapering fiber embodiments (i.e., tapering a certain portion of an optical fiber as shown respectively in FIG. 13A or FIG. 13B) may be used independently of, or in combination with, the embodiment of creating a pressure and/or temperature profile in the fiber core (e.g., applying a pressure and/or temperature gradient in the fiber core over the second portion SP of the fiber, as shown in FIGS. 15B and 15C).

FIG. 16 is a block diagram that illustrates a computer system 1600 that may assist in implementing the methods and flows disclosed herein. Computer system 1600 includes a bus 1602 or other communication mechanism for communicating information, and a processor 1604 (or multiple processors 1604 and 1605) coupled with bus 1602 for processing information. Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604.

Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a cathode ray tube (CRT) or flat panel or touch panel display for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. A touch panel (screen) display may also be used as an input device.

One or more of the methods as described herein may be performed by computer system 1600 in response to processor 1604 executing one or more sequences of one or more instructions contained in main memory 1606. Such instructions may be read into main memory 1606 from another computer-readable medium, such as storage device 1610. Execution of the sequences of instructions contained in main memory 1606 causes processor 1604 to perform the process steps described herein. One or more processors in a multiprocessing arrangement may also be employed to execute the sequences of instructions contained in main memory 1606. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 1604 for execution. Such a medium may take many forms, including but not limited to, non-volatile media, volatile media, and transmission media. Non-volatile media include, for example, optical or magnetic disks, such as storage device 1610. Volatile media include dynamic memory, such as main memory 1606. Transmission media include coaxial cables, copper wire and fiber optics, including the wires that comprise bus 1602. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1604 for execution. For example, the instructions may initially be borne on a magnetic disk of a remote computer. The remote computer can load the instructions into its dynamic memory and send the instructions over a telephone line using a modem. A modem local to computer system 1600 can receive the data on the telephone line and use an infrared transmitter to convert the data to an infrared signal. An infrared detector coupled to bus 1602 can receive the data carried in the infrared signal and place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also preferably includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the worldwide packet data communication network, now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are exemplary forms of carrier waves transporting the information.

Computer system 1600 may send messages and receive data, including program code, through the network(s), network link 1620, and communication interface 1618. In the Internet example, a server 1630 might transmit a requested code for an application program through Internet 1628, ISP 1626, local network 1622 and communication interface 1618. One such downloaded application may provide for one or more of the techniques described herein, for example. The received code may be executed by processor 1604 as it is received, and/or stored in storage device 1610, or other non-volatile storage for later execution. In this manner, computer system 1600 may obtain application code in the form of a carrier wave.

Additional embodiments are begin disclosed in the subsequent list of numbered clauses:

1a. A radiation source comprising:

a hollow core optical fiber comprising a body having a hollow core for confining a working medium, said hollow core optical fiber being operable to receive pulsed pump radiation such that said receive pulsed pump radiation propagates through the hollow core from an input end to an output end of the hollow core optical fiber;

wherein source parameters of the radiation source are configured such that the pulsed pump radiation undergoes a soliton self-compression process so as to change a spectrum of the pulsed pump radiation to form output radiation;

the broadband light source device further comprising at least one dispersion control mechanism being operable to change dispersion characteristics in a first portion of the optical fiber so as to spectrally shift a dispersive wave generated in the soliton self-compression process.

1b. A radiations source as defined in clause 1a, wherein, said source parameters also being such that the spectrum of the pulsed pump radiation has reached its maximum breadth before exiting the optical fiber via the output end.

2. A radiation source as defined in clause 1a or 1b, wherein the at least one dispersion control mechanism comprises a tapered portion of the optical fiber which overlaps with the first portion of the optical fiber.

3. A radiation source as defined in clause 2, wherein the tapered portion is configured such that a diameter of the hollow core continuously increases along the tapered portion.

4. A radiation source as defined in clause 3, wherein the tapered portion is configured such that a diameter of the hollow core continuously decreases along the tapered portion.

5. A radiation source as defined in any preceding clause, wherein the at least one dispersion control mechanism further comprises a pressure gradient arrangement being operable to apply a pressure gradient to the working medium within said first portion of the optical fiber.

6. A radiation source as defined in clause 5, wherein the pressure gradient arrangement comprises a first pressure source being connected to the input end of the hollow core, a second pressure source being connected to the hollow core at located at or near a position along the length of the optical fiber where the spectrum of the pump radiation reaches the maximum breadth and a third pressure source being connected to the output end of said hollow core.

7. A radiation source as defined in clause 5, wherein the pressure gradient arrangement comprises a first pressure chamber for enclosing said input end of the hollow core and a second pressure chamber for enclosing said output end of the hollow core.

8. A radiation source as defined in clause 5, 6 or 7, wherein the pressure gradient arrangement is operable to apply said pressure gradient such that the pressure of the working medium continuously increases along the first portion of the optical fiber.

9. A radiation source as defined in clause 5, 6 or 7, wherein the pressure gradient arrangement is operable to apply said pressure gradient such that the pressure of the working medium continuously decreases along the first portion of the optical fiber.

10. A radiation source as defined in any preceding clause, wherein the at least one dispersion control mechanism further comprises a temperature gradient arrangement being operable to apply a temperature gradient to the working medium within said first portion of the optical fiber.

11. A radiation source as defined in clause 10, wherein said temperature gradient arrangement comprises one or more temperature controlling elements attached to one or more locations of an outer surface of the optical fiber.

12. A radiation source as defined in clause 10 or 11, wherein the temperature gradient arrangement is operable to apply said temperature gradient such that the temperature of working medium continuously increases along the first portion of the optical fiber.

13. A radiation source as defined in clause 10 or 11, wherein the temperature gradient arrangement is operable to apply said temperature gradient such that the temperature of working medium continuously decreases along the first portion of the optical fiber.

14. A radiation source as defined in any preceding clause, wherein said first portion of the optical fiber is the full length of the optical fiber.

15. A radiation source as defined in any of clauses 1a to 13, wherein a first end of said first portion of the optical fiber is located at or near a position along the length of the optical fiber where the spectrum of the pump radiation reaches the maximum breadth and a second end of said first portion of the optical fiber is located at or near the output end of the optical fiber.

16. A radiation source as defined in clause 15, wherein the optical fiber further comprises a main portion, said main portion comprising a first end which coincides with the input end of the optical fiber and a second end located at a position along the length of the optical fiber where the spectrum of the pump radiation reaches the maximum breadth.

17. A radiation source as defined in clause 16, wherein said main portion comprises a substantially constant core diameter.

18. A radiation source as defined in clause 16, being operable such that the working medium in the hollow core of the main portion of the optical fiber is subject to a substantially constant pressure.

19. A radiation source as defined in any preceding clause, comprising:

said working medium disposed within the hollow core; and a pulsed pump radiation source arranged to produce said pulsed pump radiation;

wherein said source parameters comprise parameters of the pulsed pump radiation, the optical fiber and the working medium.

20. A radiation source as defined in clause 19, being operable such that a pulse duration of the input pulsed pump radiation is greater than 50 fs.

21. A radiation source as defined in clause 19 or 20, being operable such that a pulse energy of the input pulsed pump radiation is less than 1 µJ.

22. A radiation source as defined in any of clauses 19 to 21, being operable such that a soliton order of the input pulsed pump radiation is less than 20.

23. A radiation source as defined in any of clauses 19 to 22, wherein the working medium is configured to produce anomalous dispersion.

24. A radiation source as defined in any of clauses 19 to 23, wherein the working medium comprises at least one of: a noble gas and a molecular gas.

25. A radiation source as defined in any preceding clause, being operable such that the dispersive wave comprises wavelengths between 450 nm and 550 nm.

26. A radiation source as defined in any preceding clause, being operable such that the dispersion characteristics comprise a wavelength of zero group velocity dispersion of the optical fiber.

27. A radiation source as defined in any preceding clause, wherein the hollow core optical fiber comprises a cladding portion surrounding the hollow core, the cladding portion comprising a plurality of anti-resonance elements for guiding radiation through the hollow core, and, optionally, plurality of anti-resonance elements of the cladding portion are disposed in a ring structure around the hollow core.

28. A radiation source as defined in clause 27, wherein the plurality of anti-resonance elements is arranged so that each of the anti-resonance elements is not in contact with any of the other anti-resonance elements.

29. A radiation source as defined in any preceding clause, wherein the at least one dispersion control mechanism applied in the first portion of the optical fiber is arranged such that a ratio of a maximum power spectral density to a minimum power spectral density of a spectrum of the output radiation is no more than 5.

30. A radiation source as defined in any of clauses 1 to 29, wherein the at least one dispersion control mechanism applied in the first portion of the optical fiber is arranged such that a ratio of a maximum power spectral density to a minimum power spectral density of a spectrum of the output radiation is no more than 4.

31. A radiation source as defined in any of clauses 1 to 29, wherein the at least one dispersion control mechanism applied in the first portion of the optical fiber is arranged such that a ratio of a maximum power spectral density to a minimum power spectral density of a spectrum of the output radiation is no more than 3.

32. A radiation source as defined in any preceding clause, wherein said output radiation comprises at least wavelengths between 500 nm and 900 nm.

33. A metrology device comprising a radiation source as defined in any preceding clause.

34. A metrology device as defined in clause 33, comprising a scatterometer metrology apparatus, a level sensor or an alignment sensor.

35. A method of generating output radiation comprising: selecting parameters of one or more of pulsed pump radiation, a hollow core optical fiber comprising a body having a hollow core and a working medium comprised within said hollow core such that the pulsed pump radiation undergoes a soliton self-compression process so as to change a spectrum of the pulsed pump radiation so as to form output radiation,
generating said pulsed pump radiation for reception by, and propagation through, the hollow core from an input end to an output end; and applying at least one dispersion control mechanism in a first portion of the optical fiber so as to change dispersion characteristics in the first portion of the optical fiber to spectrally shift a dispersive wave generated in the soliton self-compression process.

36. A method as defined in clause 35, wherein the spectrum of the pulsed pump radiation having reached its maximum breadth before exiting the optical fiber via the output end.

37. A method as defined in clause 35 or 36, the at least one dispersion control mechanism comprises one or more of:
a continuously increasing or decreasing core diameter of the optical fiber along the first portion of the optical fiber;
a continuously increasing or decreasing pressure to which the working medium is subject along the first portion of the optical fiber; or a continuously increasing or decreasing temperature to which the working medium is subject along the first portion of the optical fiber.

38. A method as defined in any of clauses 35 to 37, wherein the first portion of the optical fiber is the full length of the optical fiber.

39. A method as defined in any of clauses 35 to 37, wherein the first portion of the optical fiber begins at or near to a position where the spectrum of the pump radiation reaches the maximum breadth and ends at the output end of the optical fiber.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A radiation source comprising:
a hollow core optical fiber comprising a body having a hollow core for confining a working medium, the hollow core optical fiber being operable to receive pulsed pump radiation such that the input pulsed pump radiation propagates through the hollow core from an input end to an output end of the hollow core optical fiber, wherein one or more source parameters of the radiation source are configured such that the pulsed pump radiation undergoes a soliton self-compression process so as to change a spectrum of the pulsed pump radiation to form output radiation; and at least one dispersion control mechanism configured to change dispersion characteristics starting at a location, in a portion of the optical fiber, after a point of maximum compression so as to spectrally shift a dispersive wave generated in the soliton self-compression process, wherein the location is selected so as to attenuate a peak of the dispersive wave to reduce sensitivity of the peak to pulse energy variations.

2. The radiation source as claimed in claim 1, wherein the one or more source parameters are also such that the spectrum of the pulsed pump radiation has reached its maximum breadth before exiting the optical fiber via the output end.

3. The radiation source as claimed in claim 2, wherein a first end of the portion of the optical fiber is located at or near a position along the length of the optical fiber where the spectrum of the pump radiation reaches the maximum breadth and a second end of the portion of the optical fiber is located at or near the output end of the optical fiber.

4. The radiation source as claimed in claim 1, wherein the at least one dispersion control mechanism comprises a tapered portion of the optical fiber which overlaps with the portion of the optical fiber.

5. The radiation source as claimed in claim 4, wherein the hollow core has a diameter and wherein the tapered portion is configured such that the diameter of the hollow core continuously increases along the tapered portion.

6. The radiation source as claimed in claim 1, wherein the at least one dispersion control mechanism comprises a pressure gradient arrangement configured to apply a pressure gradient to the working medium within the portion of the optical fiber.

7. The radiation source as claimed in claim 1, wherein the at least one dispersion control mechanism comprises a temperature gradient arrangement configured to apply a temperature gradient to the working medium within the portion of the optical fiber.

8. The radiation source as claimed in claim 1, wherein the portion of the optical fiber is the full length of the optical fiber.

9. The radiation source as claimed in claim 1, further comprising:

the working medium disposed within the hollow core; and a pulsed pump radiation source arranged to produce the pulsed pump radiation, wherein the one or more source parameters comprise parameters of the pulsed pump radiation, the optical fiber and the working medium.

10. The radiation source as claimed in claim 9, configured such that a soliton order of the input pulsed pump radiation is less than 20.

11. The radiation source as claimed in claim 1, configured such that the dispersive wave comprises wavelengths between 450 nm and 550 nm.

12. The radiation source as claimed in claim 1, configured such that the dispersion characteristics comprise a wavelength of zero group velocity dispersion of the optical fiber.

13. The radiation source as claimed in claim 1, wherein the at least one dispersion control mechanism applied in the portion of the optical fiber is arranged such that a ratio of a maximum power spectral density to a minimum power spectral density of a spectrum of the output radiation is no more than 5.

14. A metrology device comprising the radiation source as claimed in claim 1.

15. A method of generating output radiation, the method comprising:

selecting one or more parameters of one or more selected from pulsed pump radiation, a hollow core optical fiber comprising a body having a hollow core and a working medium comprised within the hollow core such that the pulsed pump radiation undergoes a soliton self-compression process so as to change a spectrum of the pulsed pump radiation so as to form output radiation, generating the pulsed pump radiation for reception by, and propagation through, the hollow core from an input end to an output end; and applying at least one dispersion control mechanism in a portion of the optical fiber so as to change dispersion characteristics starting at a location, in the portion of the optical fiber, after a point of maximum compression to spectrally shift a dispersive wave generated in the soliton self-compression process, wherein the location is selected so as to attenuate a peak of the dispersive wave to reduce sensitivity of the peak to pulse energy variations.

16. The method as claimed in claim 15, wherein the spectrum of the pulsed pump radiation has reached its maximum breadth before exiting the optical fiber via the output end.

17. The method as claimed in claim 15, wherein the at least one dispersion control mechanism comprises one or more selected from:

a continuously increasing or decreasing core diameter of the optical fiber along the portion of the optical fiber;

a continuously increasing or decreasing pressure to which the working medium is subject along the portion of the optical fiber; or a continuously increasing or decreasing temperature to which the working medium is subject along the portion of the optical fiber.

18. The method as claimed in claim 15, wherein the portion of the optical fiber is the full length of the optical fiber.

19. The method as claimed in claim 15, wherein the portion of the optical fiber begins at or near to a position where the spectrum of the pump radiation reaches the maximum breadth and ends at the output end of the optical fiber.

20. The method as claimed in claim 15, wherein the dispersion characteristics comprise a wavelength of zero group velocity dispersion of the optical fiber.

* * * * *